(12) United States Patent
Wei et al.

(10) Patent No.: US 12,337,526 B2
(45) Date of Patent: Jun. 24, 2025

(54) 3D PRINTED BATTERY AND METHOD OF 3D PRINTING A BATTERY

(71) Applicant: President and Fellows of Harvard College, Cambridge, MA (US)

(72) Inventors: Teng-Sing Wei, Santa Clara, CA (US); Jennifer A. Lewis, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1247 days.

(21) Appl. No.: 16/969,681

(22) PCT Filed: Feb. 11, 2019

(86) PCT No.: PCT/US2019/017492
§ 371 (c)(1),
(2) Date: Aug. 13, 2020

(87) PCT Pub. No.: WO2019/160810
PCT Pub. Date: Aug. 22, 2019

(65) Prior Publication Data
US 2021/0008789 A1     Jan. 14, 2021

Related U.S. Application Data

(60) Provisional application No. 62/631,146, filed on Feb. 15, 2018.

(51) Int. Cl.
*B29C 64/118*     (2017.01)
*B29K 105/16*     (2006.01)
(Continued)

(52) U.S. Cl.
CPC ............ *B29C 64/118* (2017.08); *B33Y 10/00* (2014.12); *B33Y 70/10* (2020.01); *B33Y 80/00* (2014.12);
(Continued)

(58) Field of Classification Search
CPC ..... B33Y 80/00; H01M 6/40; B29K 2105/16; B29L 2031/3468
See application file for complete search history.

(56) References Cited

U.S. PATENT DOCUMENTS 7,053,125 B2    5/2006  Lewis et al.
7,141,617 B2    11/2006 Gratson et al.
(Continued)

FOREIGN PATENT DOCUMENTS

CN          107170956 A      9/2017
WO     WO 2013/096664 A1     6/2013
(Continued)

OTHER PUBLICATIONS

Li, Jie, et al. "A hybrid three-dimensionally structured electrode for lithium-ion batteries via 3D printing." Materials & Design 119 (2017): 417-424. (Year: 2017).*

(Continued)

*Primary Examiner* — Xiao S Zhao
*Assistant Examiner* — Inja Song
(74) *Attorney, Agent, or Firm* — Crowell & Moring LLP

(57) ABSTRACT

A method of 3D printing a battery includes extruding a first electrode ink formulation through a first deposition nozzle moving relative to a substrate, and depositing one or more continuous filaments comprising the first electrode ink formulation on the substrate to print a first electrode. A separator ink formulation is extruded through a second deposition nozzle moving relative to the substrate, and one or more continuous filaments comprising the separator ink formulation is deposited on the first electrode to print a separator precursor, which is then cured to form a separator. A second electrode ink formulation is extruded through a third deposition nozzle moving relative to the substrate, and one or more continuous filaments comprising the second electrode (Continued)

ink formulation is deposited to print a second electrode on the separator. The first and second electrodes and the separator are enclosed in a package, thereby forming a battery with thick electrodes.

18 Claims, 17 Drawing Sheets

(51) Int. Cl.
 B29L 31/34 (2006.01)
 B33Y 10/00 (2015.01)
 B33Y 70/10 (2020.01)
 B33Y 80/00 (2015.01)
 H01M 4/04 (2006.01)
 H01M 4/66 (2006.01)
 H01M 10/0525 (2010.01)
 H01M 10/0585 (2010.01)
 H01M 50/403 (2021.01)

(52) U.S. Cl.
 CPC ......... *H01M 4/0404* (2013.01); *H01M 4/663* (2013.01); *H01M 10/0525* (2013.01); *H01M 10/0585* (2013.01); *H01M 50/403* (2021.01); *B29K 2105/16* (2013.01); *B29L 2031/3468* (2013.01)

(56) References Cited

U.S. PATENT DOCUMENTS

| | | | |
|---|---|---|---|
| 7,790,061 B2 | 9/2010 | Gratson et al. | |
| 7,799,251 B2 | 9/2010 | Therriault et al. | |
| 7,922,939 B2 | 4/2011 | Lewis et al. | |
| 7,956,102 B2 | 6/2011 | Lewis et al. | |
| 8,101,139 B2 | 1/2012 | Therriault et al. | |
| 8,187,500 B2 | 5/2012 | Lewis et al. | |
| 2005/0262674 A1* | 12/2005 | Reynolds, III | B82Y 10/00 29/25.03 |
| 2010/0003603 A1 | 1/2010 | Chiang et al. | |
| 2010/0330220 A1 | 12/2010 | Gratson et al. | |
| 2013/0084449 A1 | 4/2013 | Lewis et al. | |
| 2014/0314954 A1 | 10/2014 | Lewis et al. | |
| 2015/0295272 A1 | 10/2015 | Chiang et al. | |
| 2016/0056490 A1* | 2/2016 | Chiang | H01M 4/62 429/104 |
| 2016/0126558 A1* | 5/2016 | Lewis | B33Y 40/20 264/447 |
| 2016/0198576 A1* | 7/2016 | Lewis | B29C 64/106 361/761 |
| 2016/0344062 A1* | 11/2016 | Wright | H01G 9/0029 |
| 2017/0104198 A1* | 4/2017 | Duoss | H01M 50/463 |
| 2018/0034038 A1* | 2/2018 | Rogren | H01M 4/0471 |
| 2018/0205113 A1* | 7/2018 | Golodnitsky | H01M 10/058 |
| 2021/0083320 A1* | 3/2021 | Wachsman | B22F 10/38 |

FOREIGN PATENT DOCUMENTS

| | | |
|---|---|---|
| WO | WO 2014/182535 A1 | 11/2014 |
| WO | WO 2014/209994 A2 | 12/2014 |
| WO | WO 2015/069619 A1 | 5/2015 |
| WO | WO 2015/073944 A2 | 5/2015 |
| WO | WO 2015/120429 A1 | 8/2015 |
| WO | WO 2015/120430 A1 | 8/2015 |
| WO | WO 2016/153886 A1 | 9/2016 |
| WO | WO-2016144944 A1 * | 9/2016 ........ H01M 10/0436 |

OTHER PUBLICATIONS

International Search Report and Written Opinion from corresponding International application No. PCT/US19/17492, Jun. 17, 2019, 13 pp.

Bok Y. Ahn et al., "Omnidirectional Printing of Flexible, Stretchable, and Spanning Silver Microelectrodes," Science, dated Mar. 20, 2009, pp. 1590-1593, vol. 323, published online by American Association for the Advancement of Science at URL https://science.sciencemag.org/content/323/5921/1590/tab-pdf.

Gregory M. Gratson et al., "Direct writing of three-dimensional webs," Microperiodic structures, Nauture, dated Mar. 25, 2004, p. 386, vol. 428, published online by Nature Publishing group at URL www.nature.com/nature.

Jennifer A. Lewis, "Colloidal Processing of Ceramics," Journal of the American Ceramic Society, dated Oct. 2000, pp. 2341-2359, vol. 83, No. 10, published online by the American Ceramic Society at URL https://doi.org/10.1111/j.1151-2916.2000.tb01560.x.

Daniel Therriault et al., "Rheological Behavior of Fugitive Organic Inks for Direct-Write Assembly," Applied Rheology, dated Sep. 15, 2006, pp. 10112-1-10112-8, vol. 17, Issue 1, published online by De Gruyter at URL https://doi.org/10.1515/arh-2007-0001.

Willie Wu et al, "Omnidirectional Printing of 3D Microvascular Networks," Advanced Materials, dated Mar. 23, 2011, pp. 1-6, published by Wiley Online Libragy at URL https://doi.org/10.1002/adma.201004625.

Jennifer A. Lewis, "Direct Ink Writing of 3D Functional Materials," Advanced Functional Materials, vol. 16, dated Oct. 27, 2006, pp. 2193-2204, published online by Wiley Online Library at URL https://doi.org/10.1002/adfm.200600434.

\* cited by examiner

3D PRINTED BATTERY AND METHOD OF 3D PRINTING A BATTERY

RELATED APPLICATIONS

The present patent document is the national stage of International Patent Application No. PCT/US2019/017492, filed on Feb. 11, 2019, which claims the benefit of the filing date under 35 U.S.C. § 119(e) to U.S. Provisional Patent Application No. 62/631,146, filed on Feb. 15, 2018. Both of the aforementioned patent applications are hereby incorporated by reference in their entirety.

FEDERALLY SPONSORED RESEARCH OR DEVELOPMENT

The invention described in this disclosure was made with government support from the Department of Energy under contract number DE-AC02-06CH11357 and from Argonne National Laboratory under subcontract number 3F-31143. The government has certain rights in the invention.

TECHNICAL FIELD

The present disclosure is related generally to rechargeable battery technology and more particularly to 3D printing of batteries.

BACKGROUND

Rechargeable lithium-ion batteries (LIBs) are widely used in applications ranging from portable electronics to electric vehicles. Commercial LIBs are limited to simple shapes (e.g., coin, cylinder, prismatic and pouch cells) composed of repeating electrode stacks of relatively thin electrodes (20-100 µm thick) separated by a polymer or polymer-ceramic film and sandwiched between two current collecting (metal) foils.

The growing demand for LIBs with higher capacity, faster charge-discharge rates, and lower cost underscores the need for new electrode materials, battery architectures, and fabrication methods. For example, high capacity anodes based on silicon have been studied extensively, yet challenges remain in controlling their pronounced volumetric changes during lithiation/delithiation cycles. More recently, 3D battery architectures templated from colloidal crystals or holographically defined polymer lattices have been reported, which exhibit high charge/discharge rates. However, their energy capacity is limited by both the interconnected porosity required for electrolysis deposition as well as the resulting thin conformal electrodes deposited onto these 3D structured current collectors.

The volumetric ratio of active to inactive materials within lithium-ion batteries and, consequently, their energy capacity, scales linearly with electrode thickness for a given areal footprint. However, ionic and electronic transport through thick electrodes is more difficult, and thus thicker electrodes may have significantly reduced power densities.

BRIEF SUMMARY

A 3D printed battery and a method of 3D printing a battery are described herein.

According to a first embodiment, the method includes extruding a packaging ink formulation through a deposition nozzle moving relative to a substrate and depositing one or more continuous filaments comprising the packaging ink formulation in a predetermined pattern on the substrate to print a first package portion. A first electrode ink formulation is then extruded through a first deposition nozzle moving relative to the substrate, and one or more continuous filaments comprising the first electrode ink formulation are deposited in a predetermined pattern to print a first electrode on a first current collector disposed on the first package portion. A separator ink formulation is then extruded through a second deposition nozzle moving relative to the substrate, and one or more continuous filaments comprising the separator ink formulation are deposited in a predetermined pattern to print a separator on the first electrode. A second electrode ink formulation is extruded through a third deposition nozzle moving relative to the substrate, and one or more continuous filaments comprising the second electrode ink formulation are deposited in a predetermined pattern to print a second electrode on the separator. A packaging ink formulation is extruded through a fourth deposition nozzle moving relative to the substrate, and one or more continuous filaments comprising the packaging ink formulation are deposited in a predetermined pattern to form a second package portion in contact with the first package portion, where the second package portion overlies a second current collector disposed on the second electrode, thereby forming a battery by 3D printing.

According to a second embodiment, the method includes extruding a first electrode ink formulation through a first deposition nozzle moving relative to a substrate, and depositing one or more continuous filaments comprising the first electrode ink formulation in a predetermined pattern to print a first electrode on the substrate. A separator ink formulation is then extruded through a second deposition nozzle moving relative to the substrate, and one or more continuous filaments comprising the separator ink formulation are deposited in a predetermined pattern to print a separator precursor on the first electrode; the separator precursor is cured to form a separator on the first electrode. A second electrode ink formulation is then extruded through a third deposition nozzle moving relative to the substrate, and one or more continuous filaments comprising the second electrode ink formulation are deposited in a predetermined pattern to print a second electrode on the separator. Each of the first and second electrodes has a thickness of at least about 300 microns. The first and second electrodes and the separator are enclosed in a package, thereby forming a battery with thick electrodes.

The 3D printed battery comprises a package enclosing a first electrode, a separator on the first electrode, and a second electrode on the separator, where a first current collector is in electrical contact with the first electrode, and a second current collector is in electrical contact with the second electrode. At least the first electrode, the separator, and the second electrode may be formed by 3D printing, as described herein. The package, the first current collector, and/or the second current collector may also be formed by 3D printing.

BRIEF DESCRIPTION OF THE DRAWINGS

FIG. 1A shows printing of a packaging ink formulation, FIG. 1B shows printing of a cathode (or anode) ink formulation, FIG. 1C shows printing of a separator ink formulation, and FIG. 1D shows printing of an anode (or cathode) ink formulation.

DETAILED DESCRIPTION

The design, fabrication, and electrochemical performance of 3D printed lithium ion batteries, which may include thick, biphasic semi-solid electrodes with enhanced ionic and electronic transport, is reported in this disclosure. The electrodes may exhibit a ten-fold higher areal capacity than previous battery designs, such as those described in U.S. Patent Application Publication 2016/0126558, "Three-Dimensional Electrode Architecture for a Battery." The electrodes may be 3D printed from rheologically-tailored electrode ink formulations that include dispersed electroactive particles and attractive conductive (e.g., carbon) particles in a lithium-based electrolyte. The attractive conductive particles can form a percolative network through the thick electrodes, thereby increasing ionic and electronic transport. Packaging and separator ink formulations based on curable polymer composites and having suitable rheological properties for 3D printing may also be utilized. Also described in this disclosure is the use of four different ink formulations, cathode, anode, packaging, and separator ink formulations, to fabricate nearly-fully 3D-printed and packaged lithium ion batteries (LIBs) having arbitrary form factors. The disclosed methods may eliminate the need for drying, electrolyte-infilling, calendering, clamping, and heat-sealing processes that are typically associated with conventional LIB manufacturing.

FIGS. 1A-1D are schematics showing 3D printing of various components of a battery.

Figure 1A:
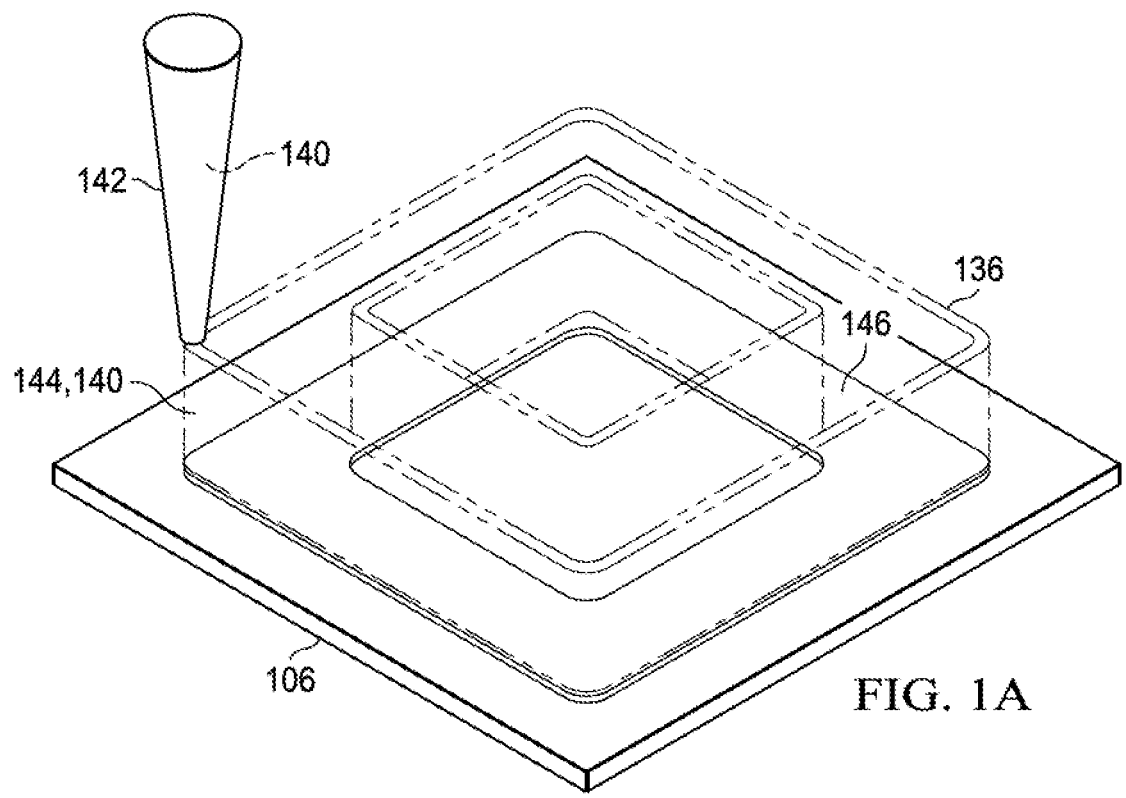
FIGS. 1A-1D are schematics of a method of 3D printing various components (package, cathode, separator, anode) of a battery, where

Referring first to FIG. 1A, the method includes extruding a packaging ink formulation 140 through a deposition nozzle 142 moving relative to a substrate 106, and depositing one or more continuous filaments 144 comprising the packaging ink formulation 140 in a predetermined pattern to form a first package portion on the substrate 106. In some embodiments, the predetermined pattern is a multilayer donut configuration, but there are no fundamental limits to the size and shape (form factor) of the electrode 112, and consequently the battery 138, that can be fabricated using 3D printing as described herein. Accordingly, the term "predetermined pattern" as used throughout this disclosure refer to a 1D, 2D, or 3D predetermined pattern.

Figure 1B:
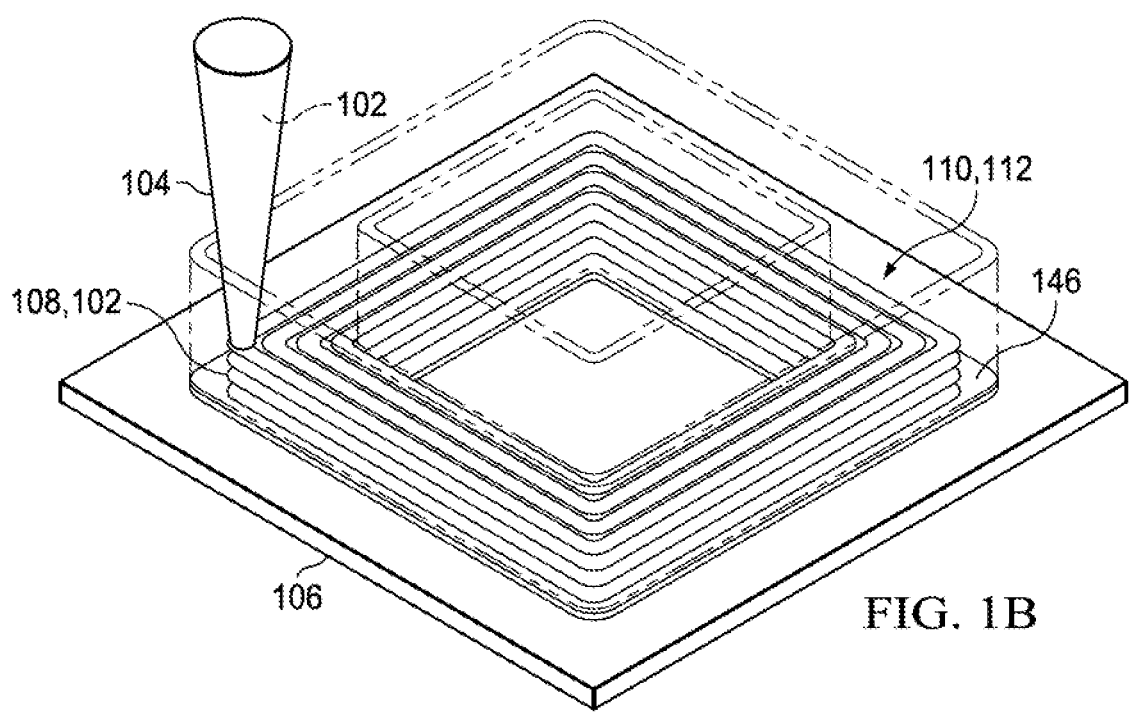

Referring to FIG. 1B, a first electrode ink formulation 102 is then extruded through a first deposition nozzle 104 moving relative to the substrate 106, and one or more continuous filaments 108 comprising the first electrode ink formulation 102 are deposited in a predetermined pattern 110 to print a first electrode 112 on a first current collector disposed on the first package portion.

Figure 1C:
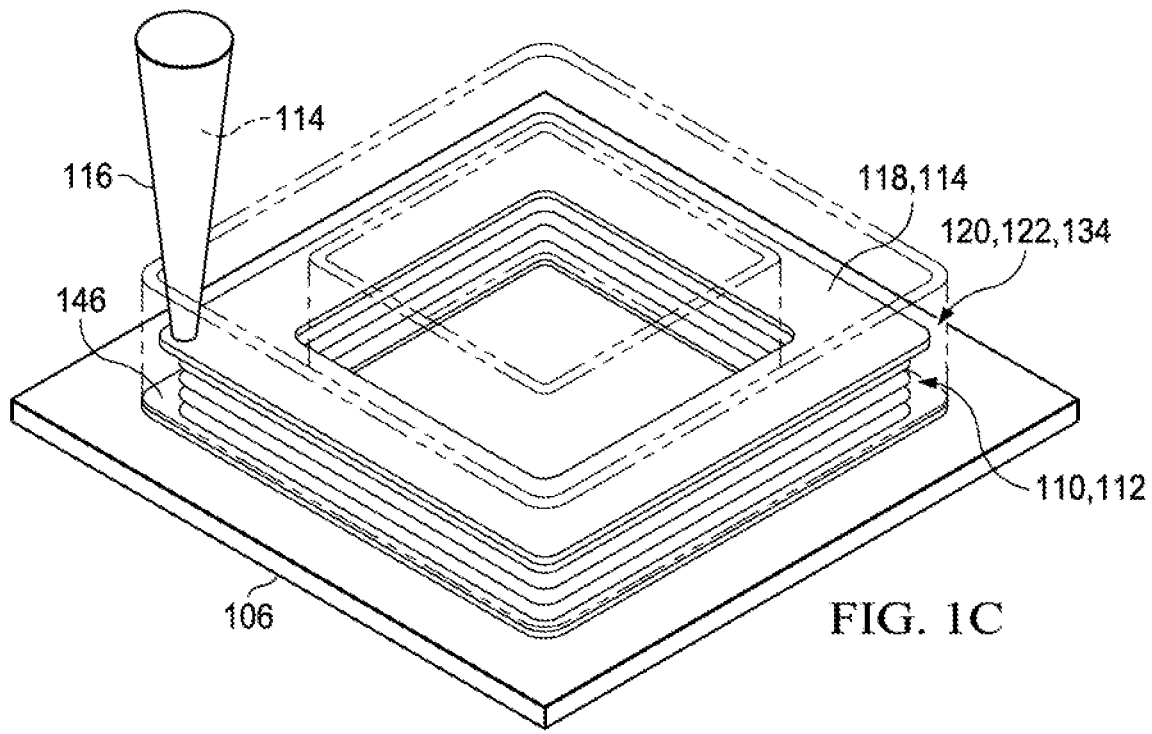

In FIG. 1C, a separator ink formulation 114 is extruded through a second deposition nozzle 116 moving relative to the substrate 106, and one or more continuous filaments 118 comprising the separator ink formulation 114 are deposited in a predetermined pattern 120 to print a separator 134, or separator precursor 122, on the first electrode 112.

Figure 1D:
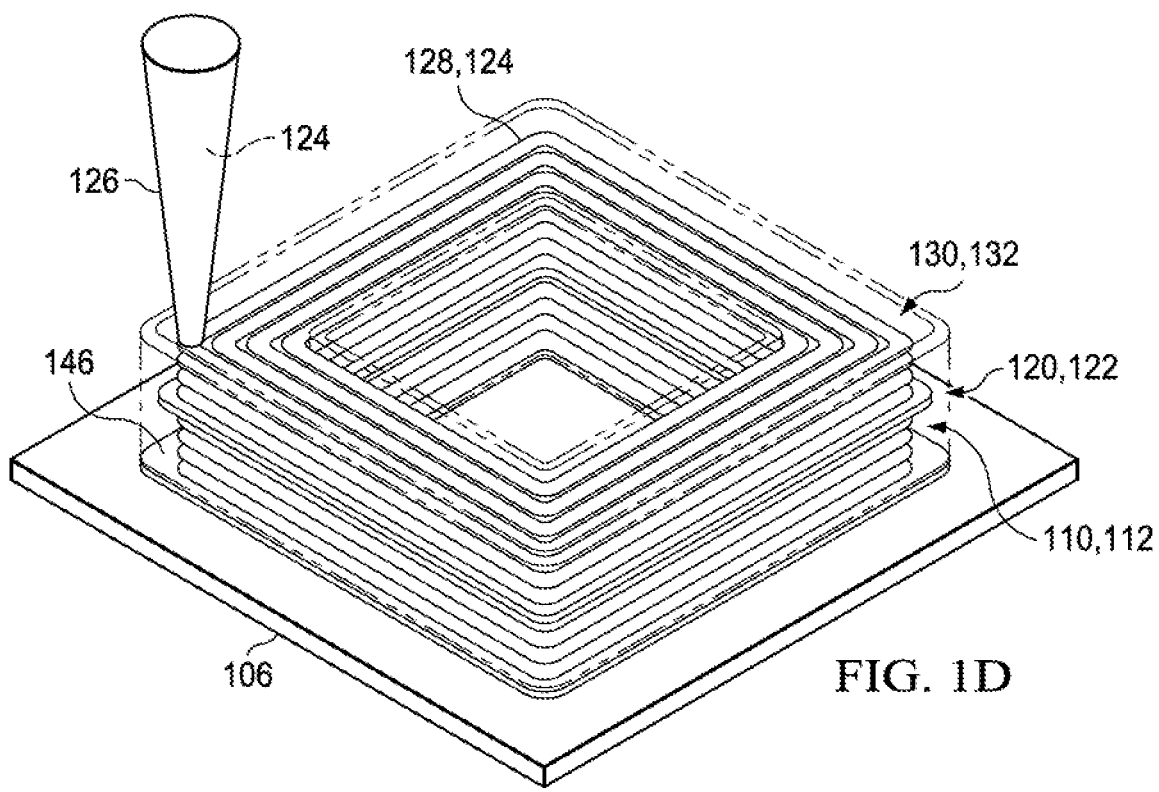

In FIG. 1D, a second electrode ink formulation 124 is extruded through a third deposition nozzle 126 moving relative to the substrate 106, and one or more continuous filaments 128 comprising the second electrode ink formulation 124 are deposited in a predetermined pattern 130 to print a second electrode 132 on the separator 134. The first and second electrodes 112,132 serve as a cathode and anode for the battery 138. As would be recognized by one of ordinary skill in the art, the first electrode 112 may function as either the cathode or the anode, and the second electrode 132 may also function as either the anode or the cathode.

Figure 2:
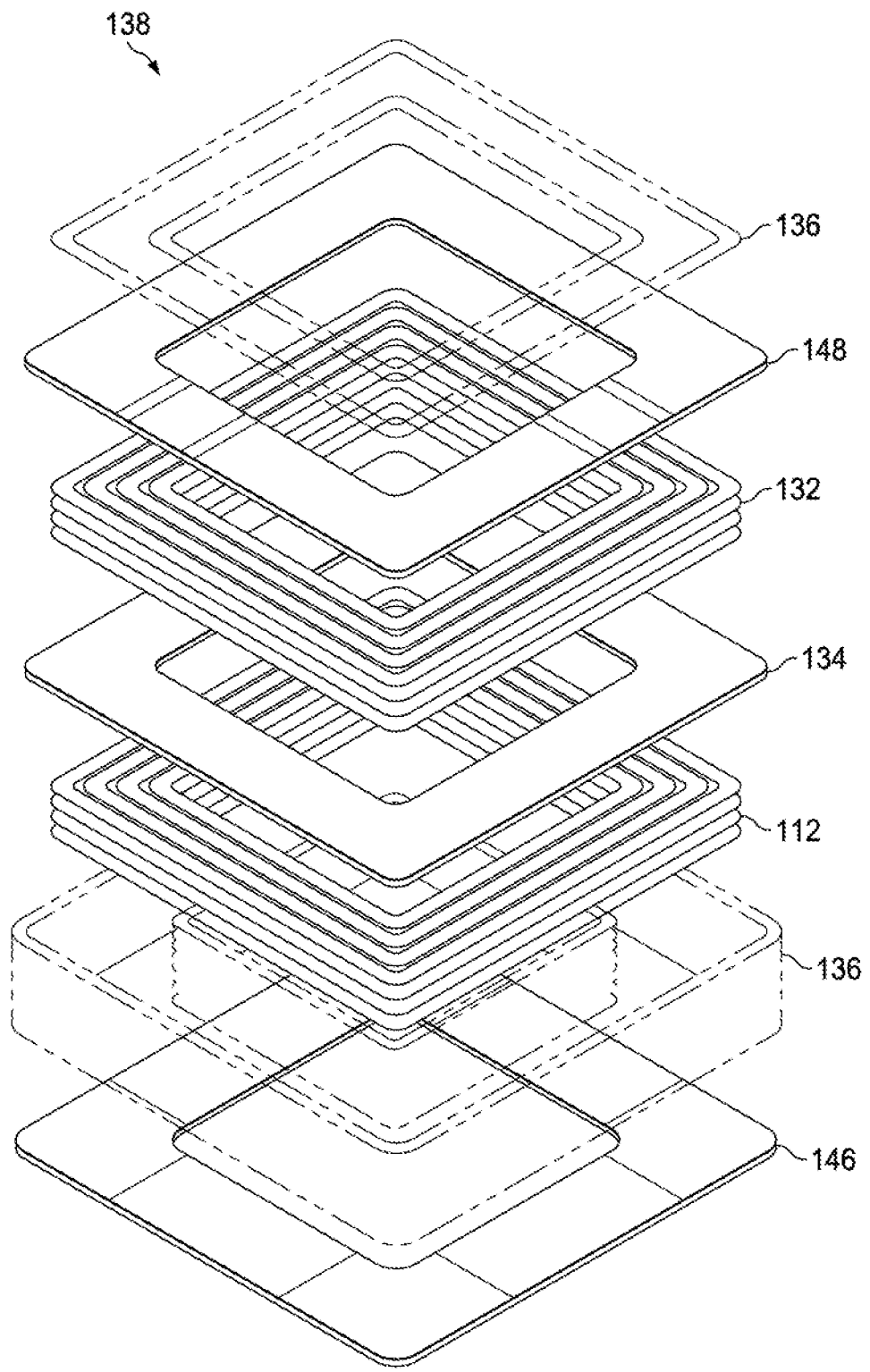
FIG. 2 is a schematic (exploded view) of an exemplary 3D-printed Li-ion battery.

In a further step, a packaging ink formulation is extruded through a fourth deposition nozzle moving relative to the substrate, and one or more continuous filaments comprising the packaging ink formulation are deposited in a predetermined pattern to form a second package portion in contact with the first package portion, thereby creating a sealed package 136. It is noted that the terms "package" and "packaging" may be used interchangeably throughout this disclosure. The second package portion overlies a second current collector 148 disposed on the second electrode, as shown in FIG. 2. Thus, a battery 138 is formed by 3D printing.

As would be recognized by the skilled artisan, the phrase "deposition nozzle moving relative to a substrate" used herein encompasses the following scenarios: (a) the deposition nozzle being moved while the substrate remains stationary, (b) the substrate being moved while the deposition nozzle remains stationary, or (c) both the deposition nozzle and the substrate being moved.

The separator ink formulation 114 may be cured to form the separator 134 shown in FIG. 2 upon exposure to a suitable activator (e.g., ultraviolet (UV) radiation, heat, or a chemical curing agent). Prior to curing, the separator 134 may be referred to as a separator precursor 122. The exposure to the activator may occur during or after deposition. The separator ink formulation 114 may include a curable resin, inorganic filler particles, and an electrolyte. In one example, the separator ink formulation 114 includes a UV-curable resin. To effect UV curing, a commercially available UV lamp of a suitable wattage and wavelength may be employed for a time duration typically ranging from about 5 minutes to about 60 minutes.

Similarly, the packaging ink formulation 140 may undergo curing to form a rigid package from the first and second package portions. The packaging ink formulation 140 may include a curable resin and inorganic filler particles. The curing may entail, as described above, exposure to a suitable activator (e.g., ultraviolet (UV) radiation, heat, or a chemical curing agent) during or after deposition. The packaging ink formulation 114 may include a UV-curable resin, and UV curing may be carried out as described above.

As described above, the substrate 106 may include a first current collector 146 in electrical contact with the first electrode 112, and a second current collector 148 may be positioned in electrical contact with the second electrode 132. The first and/or second current collectors 146,148 may be 3D printed or otherwise fabricated from a conductive material (e.g., stainless steel, aluminum, or carbon), as described below.

Accordingly, a 3D printed battery 138 comprises a package 136 enclosing a first electrode 112, a separator 134 on the first electrode 112, and a second electrode 132 on the separator 134, where a first current collector 146 is in electrical contact with the first electrode 112, and where a second current collector 148 is in electrical contact with the second electrode 132. As indicated in FIG. 2, the first and second current collectors 146,148 may also be enclosed by the package 136.

Returning to FIGS. 1A-1D, another embodiment for 3D printing the battery 138 is described. Referring first to FIG. 1B, a first electrode ink formulation 102 is extruded through a first deposition nozzle 104 moving relative to a substrate 106, and one or more continuous filaments 108 comprising the first electrode ink formulation 102 are deposited in a predetermined pattern 110 to print a first electrode 112 on the substrate 106. In some embodiments, the predetermined pattern 110 is a multilayer donut configuration, but there are no fundamental limits to the size and shape (form factor) of the electrode 112, and consequently the battery 138, that can be fabricated using 3D printing as described herein. The first electrode 112 may be printed layer by layer as illustrated in FIG. 1B to a thickness (height) of at least about 300 microns.

Referring now to FIG. 1C, a separator ink formulation 114 is extruded through a second deposition nozzle 116 moving relative to the substrate 106, and one or more continuous filaments 118 comprising the separator ink formulation 114 are deposited in a predetermined pattern 120 to print a separator 134 or, more typically, a separator precursor 122, on the first electrode 112. The separator precursor 122 may then be cured to form the separator 134 shown in FIG. 2 upon exposure to a suitable activator (e.g., ultraviolet (UV) radiation, heat, or a chemical curing agent). The exposure may occur during or after deposition. Typically, the separator ink formulation 114 includes a UV-curable resin, as discussed further below. To effect UV curing, a commercially available UV lamp of a suitable wattage and wavelength may be employed for a time duration typically ranging from about 5 minutes to about 60 minutes.

Referring now to FIG. 1D, a second electrode ink formulation 124 is extruded through a third deposition nozzle 126 moving relative to the substrate 106, and one or more continuous filaments 128 comprising the second electrode ink formulation 124 are deposited in a predetermined pattern 130 to print a second electrode 132 on the separator 134. The second electrode 132 may be printed layer by layer to a thickness (height) of at least about 300 microns. The first and second electrodes 112,132 serve as a cathode and anode for the battery 138. As would be recognized by one of ordinary skill in the art, the first electrode 112 may function as either the cathode or the anode, and the second electrode 132 may also function as either the anode or the cathode.

Finally, the first and second electrodes 112,132 and the separator are enclosed in a package 136, thereby forming a battery 138 with thick electrodes 112,132. In the exploded view of FIG. 2, the package 136 is shown in two separate parts that may be formed separately (e.g., by 3D printing as discussed below) and sealed to form the battery 138.

The method may further include printing the package 136, as illustrated in FIG. 1A. A packaging ink formulation 140 may be extruded through a fourth deposition nozzle 142 moving relative to the substrate 106, and one or more continuous filaments 144 comprising the packaging ink formulation 140 may be deposited in a predetermined pattern on the substrate 106. The printing of the package 136 may occur in at least two steps; a first step may occur prior to the printing of the first electrode 112, as shown in FIG. 1A, and a second step may occur after the printing of the second electrode 132, the result being shown in FIG. 2. Like the separator ink formulation 114, the packaging ink formulation may include a curable resin, such that printing of the package 136 includes a curing step during or after deposition, as described above.

The substrate 106 may include a first current collector 146 in electrical contact with the first electrode 112, as shown in FIGS. 1A-1D. On the other side of the package 136, as shown in FIG. 2, a second current collector 148 may be positioned in electrical contact with the second electrode 132. The first and/or second current collectors 146,148 may be 3D printed or otherwise fabricated from a conductive material (e.g., stainless steel, aluminum, or carbon). To print the first or second current collector 146,148, a conductive ink formulation may be extruded through a deposition nozzle moving relative to the substrate 106, and one or more continuous filaments comprising the conductive ink formulation may be deposited in a predetermined pattern on the substrate (deposition surface). The conductive ink formulation may include conductive particles, such as stainless steel, silver, or carbon particles, in a curable resin (e.g., epoxy, acrylonitrile butadiene styrene (ABS), or polylactic acid (PLA)) that may be cured upon deposition. As described in an Example below, the first and/or second current collectors 146,148 may alternatively be fabricated (e.g., by laser cutting) from a conductive sheet, such as a glassy (amorphous) carbon sheet.

The above description makes reference to a number of deposition nozzles (e.g., first, second, third, and fourth deposition nozzles). As would be recognized by the skilled artisan, the same or different deposition nozzles may be employed for 3D printing of the battery components. Since the printing of each component typically occurs serially, where the printing of one component (e.g., the first electrode 112) is completed before printing of the next component (e.g., the separator 134) begins, it is possible that the same deposition nozzle may be employed for some or all of the printing steps. In this case, the first, second, third, and/or fourth deposition nozzles may be the same nozzle. On the other hand, multi-nozzle printing systems are available and printing may be expedited by using different deposition nozzles for the printing of some or all of the battery components.

Figure 3A:
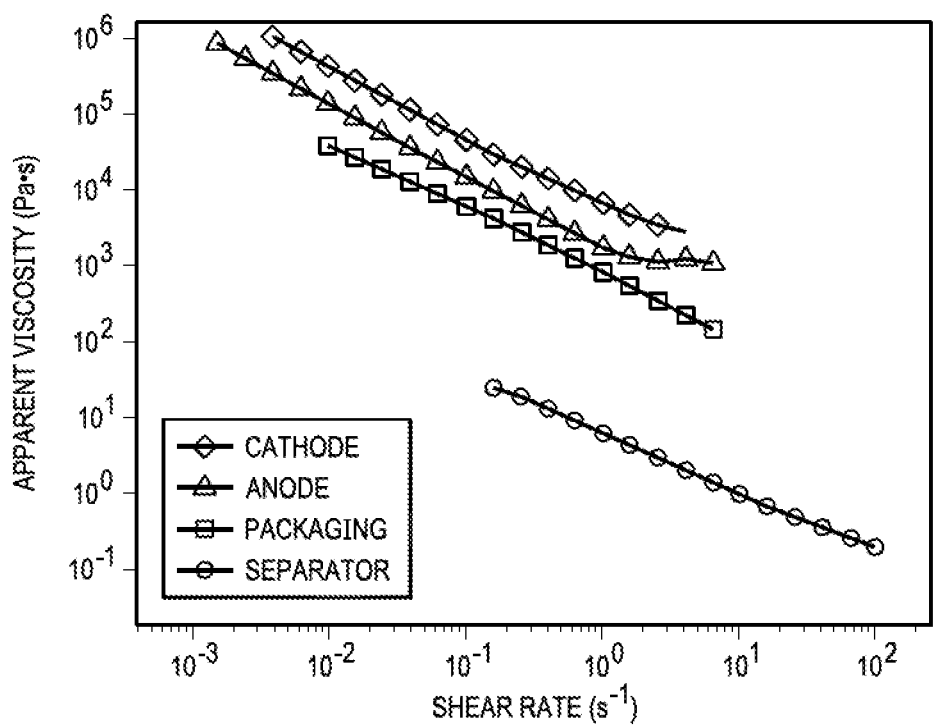
FIG. 3A shows apparent viscosity as a function of shear rate for ink formulations suitable for printing the cathode, anode, package, and separator of a 3D printed battery.
Figure 3B:
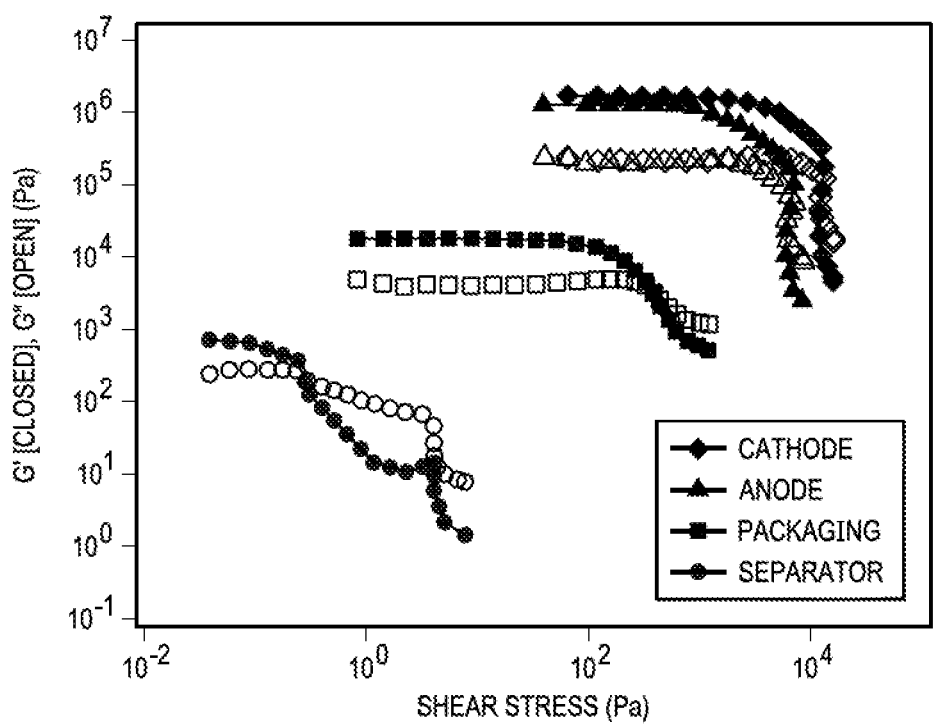
FIG. 3B shows elastic (G') and loss (G") moduli for ink formulations suitable for printing the cathode, anode, package, and separator of a 3D printed battery.
Figure 4A:
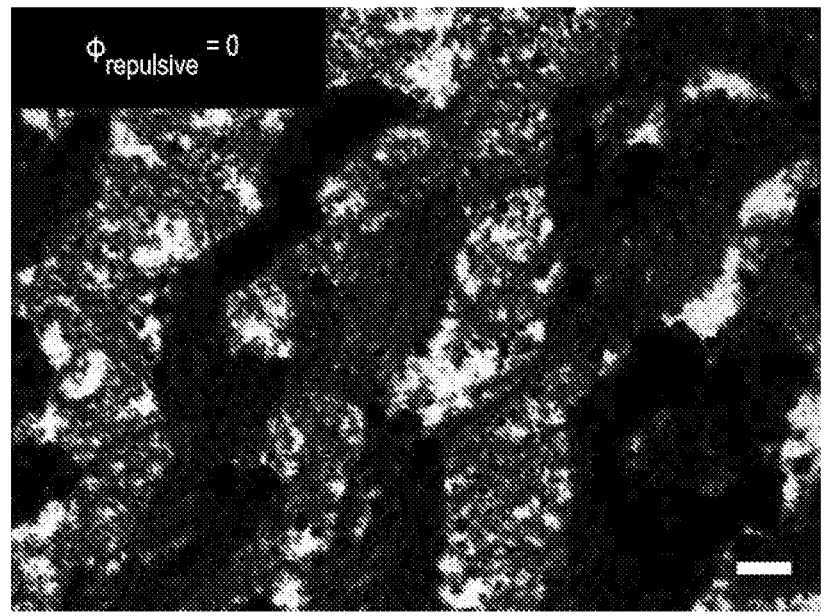
FIGS. 4A-4D show micrographs of model biphasic ink formulations including attractive carbon particles (1.5 vol. %) and repulsive silica particles, where each image includes one of 0, 0.1, 0.2, and 0.3 volume percent of the repulsive particles; the scale bars are 20 µm.
Figure 4B:
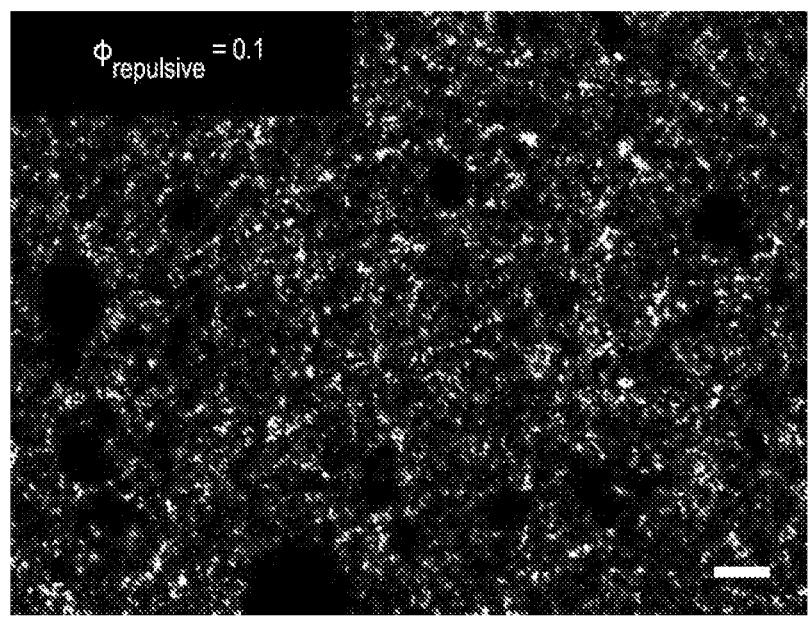
Figure 4C:
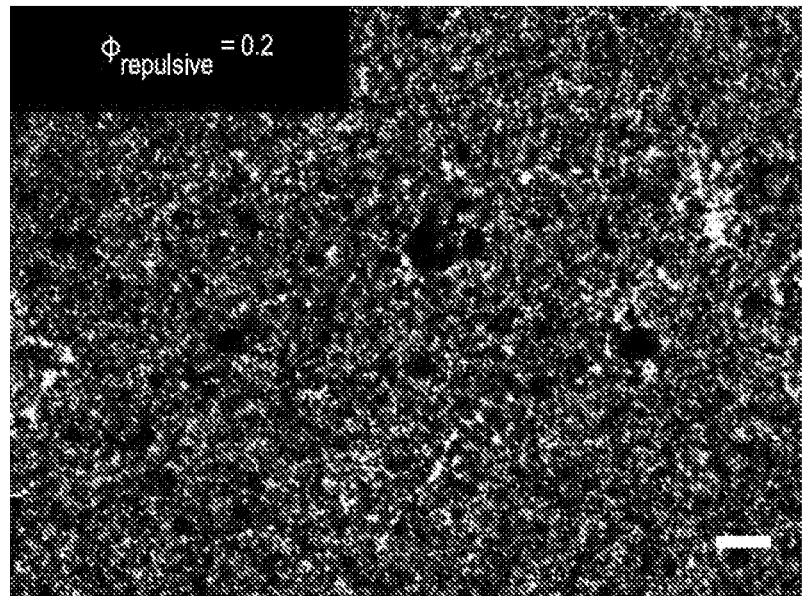
Figure 4D:
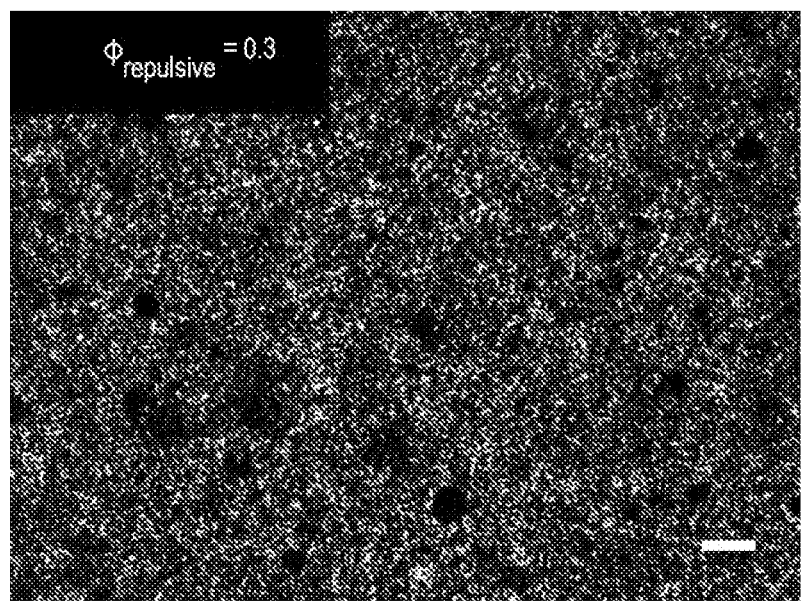

To facilitate 3D printing, each of the ink formulations 102,114,124,140 described above may be understood to exhibit a strain-rate dependent viscosity. Thus, the ink formulations may be described as being viscoelastic or, more specifically, shear-thinning, a characteristic that provides a low viscosity at high shear rates (e.g., while passing through the deposition nozzle) and a higher viscosity at low shear rates (e.g., when deposited). The flow properties of four exemplary ink formulations (the first electrode ink formulation, labeled "cathode"; the second electrode ink formulation, labeled "anode"; the packaging ink formulation, labeled "packaging", and the separator ink formulation, labeled "separator") are shown in FIGS. 3A and 3B, which plot apparent viscosity as a function of shear rate and elastic (G') and loss (G") moduli as a function of shear stress, respectively.

The first and second electrodes 112,132, which may in some embodiments be referred to as first and second semi-solid electrodes 112, 132, can be fabricated with larger thicknesses than conventional electrodes without a loss in electronic conductivity. For example, the thickness of each electrode 112,132 may be at least about 600 microns, or at least about 900 microns, and as large as 2,000 microns (2 mm). Together, the first and second electrodes 112,132 may therefore have a volumetric content of at least about 50 vol. % and as high as about 80 vol. % of the battery. Despite the large thicknesses of the first and second electrodes 112,132, they can maintain a high electronic conductivity due to their biphasic structure, as explained below. For example, an electronic conductivity of at least about 10 mS cm$^{-1}$ may be achieved for each of the first and second electrodes 112,132.

The first electrode ink formulation 102 may include first electroactive particles, conductive particles, and an electrolyte. The first electrode ink formulation 102 may also include a dispersant, such as a nonionic dispersant present in an amount sufficient to sterically stabilize the first electroactive particles, but insufficient to sterically stabilize the conductive particles. For example, the nonionic dispersant may be present in an amount from about 0.1 wt. % to about 3 wt. % with respect to the first electroactive particles to achieve the desired steric stabilization. Thus, the conductive particles can form a percolating conductive network through the first electroactive particles, even at relatively low volume fractions, such as less than about 3 vol. %. An exemplary nonionic dispersant may comprise polyvinylpyrrolidone (PVP).

The first electroactive particles may include one or more of the following: $Li_4Ti_5O_{12}$ (LTO), $LiNi_{0.5}Mn_{1.5}O_4$ (LNMO), $LiCoO_2$, $LiFePO_4$ (LFP), $LiTi_2(PO_4)_3$, $V_2O_5$, $LiV_3O_8$, $MnO_2$, Sn-based oxides, composite alloys, and non-oxides (e.g., silicon). The conductive particles may comprise an electrically conductive material, such as carbon (e.g., carbon black, graphene, carbon nanotubes) or a metal or alloy. The electrolyte may comprise a salt, such as a lithium salt, and a polar solvent, which may be aqueous or nonaqueous (such as propylene carbonate). A minimum concentration of the salt in the electrolyte is typically 0.1 M, with salt concentrations up to 1 M or up to 5 M being employed depending on the polar solvent.

Similarly, the second electrode ink formulation 124 may include second electroactive particles, conductive particles, and an electrolyte. The second electrode ink formulation 124 may also include a dispersant, such as a nonionic dispersant present in an amount sufficient to sterically stabilize the second electroactive particles, but insufficient to sterically stabilize the conductive particles. For example, the nonionic dispersant may be present in an amount from about 0.1 wt. % to about 3 wt. % with respect to the second electroactive particles to achieve the desired steric stabilization. Thus, the conductive particles can form a percolating conductive network through the second electroactive particles, even at relatively low volume fractions, such as less than about 3 vol. %. An exemplary nonionic dispersant may comprise polyvinylpyrrolidone (PVP).

The second electroactive particles may include one or more of the following: $Li_4Ti_5O_{12}$ (LTO), $LiNi_{0.5}Mn_{1.5}O_4$ (LNMO), $LiCoO_2$, $LiFePO_4$ (LFP), $LiTi_2(PO_4)_3$, $V_2O_5$, $LiV_3O_8$, $MnO_2$, Sn-based oxides, composite alloys, and non-oxides (e.g., silicon). The conductive particles may comprise an electrically conductive material, such as carbon (e.g., carbon black, graphene, carbon nanotubes) or a metal or alloy. The electrolyte may comprise a salt, such as a lithium salt, and a polar solvent, which may be aqueous or nonaqueous (such as propylene carbonate). A minimum concentration of the salt in the electrolyte is typically 0.1 M, with salt concentrations up to 1 M or up to 5 M being employed depending on the polar solvent.

Due to the presence of a suitable amount of the (optional) nonionic dispersant in the first and second electrode ink formulations 102,124, the interactions among the electroactive particles may be primarily or exclusively repulsive, and interactions among the conductive particles may be primarily or exclusively attractive. Consequently, as indicated above, the electroactive particles may be dispersed in the electrolyte while the conductive particles form a percolating conductive network through the electroactive particles. Particles having repulsive interactions may be referred to as repulsive particles, and particles having attractive interactions may be referred to as attractive particles. The term "biphasic" is used in reference to a suspension comprising two populations of particles, where one population makes up a repulsive phase and the other population makes up an attractive phase. Cross-interactions between the two populations of particles tend to be repulsive. Such biphasic electrode suspensions are described in detail in International Application No. PCT/US2016/022740, which was published on Sep. 29, 2016, under International Publication No. WO 2016/153886 (WO '886) and is hereby incorporated by reference in its entirety. The first and second electrode ink formulations described herein may have any of the components, compositions, characteristics, and/or properties described for the biphasic electrode suspensions in WO '886. Similarly, the first and second electrodes described herein may have any of the components, compositions, characteristics, and/or properties described for the electrodes in WO '886.

The packaging ink formulation 140 and separator ink formulation 114 may be based on curable composites. The separator ink formulation 114 may comprise a curable resin, such as a UV curable resin, inorganic filler particles, and an electrolyte. Similarly, the packaging ink formulation 140 may include a curable resin (e.g., a UV curable resin) and inorganic filler particles, without the electrolyte. Both of these ink formulations may be tailored to exhibit the desired shear thinning and viscoelastic responses required for direct ink writing, as can be observed from FIGS. 3A and 3B (data labeled "packaging" and "separator"). Typically, the separator 134 is fabricated from a single printed layer or just a few printed layers, whereas the packaging 136 may have a fairly high aspect ratio and be built up from numerous printed layers. Ideally, the packaging 136 exhibits high strength and rigidity and further provides hermetic sealing to protect the cathode, anode, and separator e.g., from moisture and oxygen. It is advantageous that the packaging ink formulation 140 can adhere to itself and other components, such as the current collectors 146,148. The separator 134, which may be very thin (e.g., from about 5 to about 10 microns) is preferably strong and uniform and able to support additional printed layers. Additionally, the separator 134 acts as an electrical insulator with high ionic conductivity.

The inorganic filler particles selected for the separator ink formulation 114 and/or the packaging ink formulation 140 may comprise any non-reactive, electrically insulating particles, such as oxide particles (e.g., silica or alumina particles). The curable resin may be an epoxy resin, such as a UV curable epoxy resin. The inorganic filler particles may be present in the ink formulations in an amount ranging from about 0.1 vol. % to about 50 vol. %, or from about 1 vol. % to about 10 vol. %.

In one example for printing the packaging 136, the packaging ink formulation 140 may be a composite of a UV-curable epoxy and fumed $SiO_2$ (4 vol. %), which is capable of bonding to the current collector and itself during the printing process. After UV curing, it may provide a protective shield to the electrodes 112,132 within the printed LIB 138.

In one example for printing the separator 134, the separator ink formulation 114 may be a composite of a UV-curable ethoxylated trimethylolpropane triacrylate (ETPTA), $Al_2O_3$ particles, electrolyte (1M LiTFSI/PC) and a photo-initiator. The $Al_2O_3$ nanoparticles may be dispersed using a nonionic dispersant, such as Triton X-100 (TX-100). Since a thin separator layer is desired for faster ionic transport across the separator, the separator ink formulation may exhibit an apparent viscosity and a shear elastic modulus that are several orders of magnitude lower than those exhibited by the first and second electrode ink formulations.

Exemplary electrode ink formulations 102,124 prepared as described in the examples below include first electroactive particles based on LFP to form the first electrode (or cathode) and second electroactive particles based on LTO to form the second electrode (or anode). The LFP/LTO electrochemical couple is chosen for the examples due to its low volumetric change upon cycling and exceptional thermal stability. Ketjenblack (KB) carbon particles are employed as the conductive particles due to their high electronic conductivity and low percolation threshold. To create the first and second electrode ink formulations, the LFP particles and the carbon particles are suspended and mixed sequentially in a solution including a lithium salt and a nonpolar solvent (a 1M lithium bis(trifluoromethane) sulfonimide (LiTFSI)/propylene carbonate (PC) solution) that may serve as an electrolyte. Without additives, each particle population rapidly flocculates due to van der Waals interactions under the high ionic strength condition. To selectively stabilize the electroactive particles in the concentrated (30 vol. %) electrode ink formulations, a non-ionic dispersant such as polyvinylpyrrolidone (PVP) is included at a concentration of 1 wt. % with respect to the electroactive material content. The procedure is repeated for the LTO and carbon particles. The PVP-coated LFP and LTO particles are found to remain stable at high (1 M) salt concentrations, whereas the carbon particles form a percolative network.

The first and second electrode ink formulations 102,124 may contain a high electroactive material content coupled with an adequate conductive particle network to overcome the resistive nature of most electrochemically active Li-ion compounds. These electrode ink formulations also preferably exhibit shear thinning behavior, as discussed above in regard to FIGS. 3A and 3B. As can be seen from the data, at a characteristic (printing) shear rate of 1 $s^{-1}$, the apparent viscosities for LFP and LTO are 6.27 kPa s and 1.75 kPa s, respectively. In addition, both LFP and LTO electrode ink formulations behave predominantly as elastic solids (G'»G") with respective G' values of 1.59 MPa and 1.25 MPa, but yield into a flowable state beyond their shear yield stress ($\rho_y$) values of 3.96 kPa and 1.33 kPa, respectively. Once the LFP and LTO electrode ink formulations exit the deposition nozzle and return to a zero-shear condition, they rapidly stiffen and can retain a filamentary shape.

Figure 5:
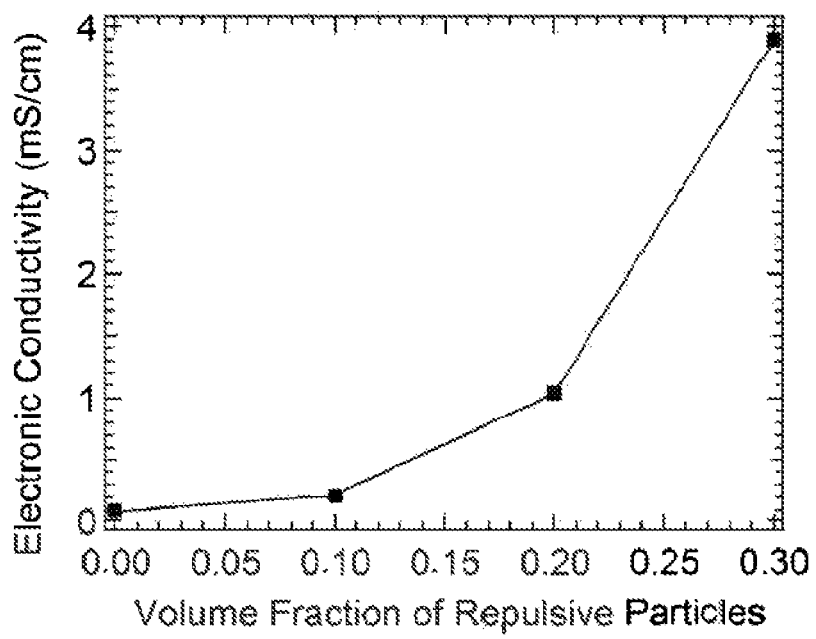
FIG. 5 shows electronic conductivity data for the model biphasic ink formulations of FIGS. 4A-4D.

The effects of electroactive material content on the electrical conductivity and microstructure of the exemplary electrode ink formulations is investigated. To facilitate imaging, a model biphasic ink is created with varying volume fraction of repulsive silica particles, $\phi_{repulsive}$ of 0 to 0.3, at a fixed volume fraction of attractive carbon particles, $\phi_{attractive}$ of 0.015. In this example, the repulsive $SiO_2$ particles (e.g., $SiO_2$ particles stabilized by PVP) are used to mimic the effect of PVP-stabilized electroactive particles. Since the repulsive $SiO_2$ particles are optically transparent in the index-matched liquid medium, it is possible to observe the de-agglomeration of the attractive carbon particles. As observed in FIGS. 4A-4D, the presence of the repulsive particles alters the structure of the attractive carbon particle network. In the absence of repulsive particles, the attractive network consists of large, dense clusters that surround open regions of electrolyte. Upon adding repulsive particles, the attractive carbon particle network becomes more homogenous, favoring the formation of more tenuous, linear chains with fewer bonds between carbon particles. Essentially, these repulsive particles frustrate the formation of attractive particle bonds thereby yielding aggregated systems that are kinetically trapped in a more structurally uniform state. The concomitant rise in electronic conductivity with increasing $\phi_{repulsive}$, as shown in FIG. 5, reflects this observed microstructural evolution within biphasic electrode ink formulations.

EXAMPLES

Impact of Electrode Thickness

Figure 6A:
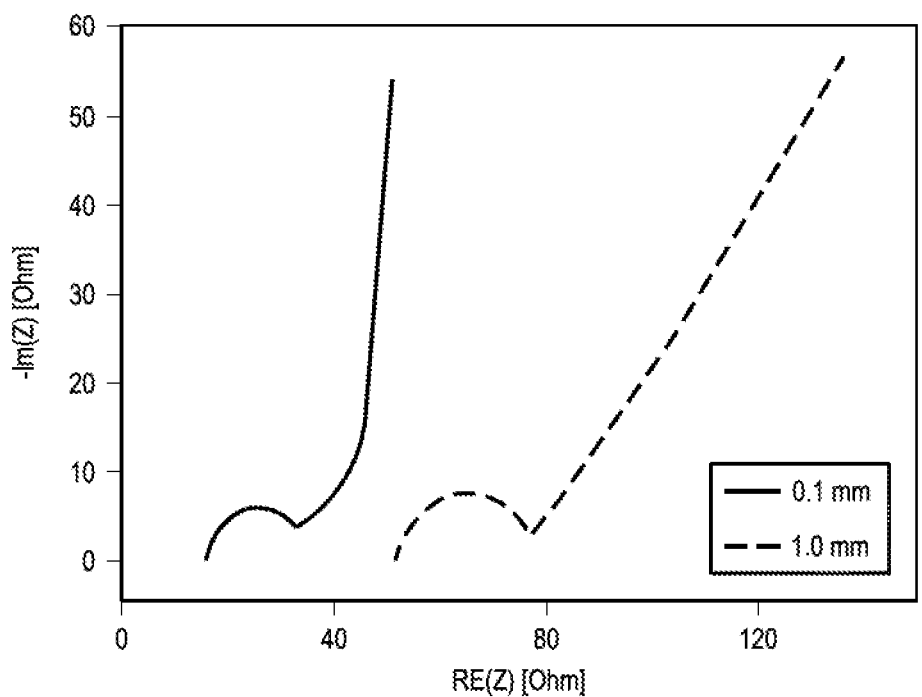
FIG. 6A shows AC impedance data comparing $LiFePO_4$ (LFP)/$Li_4Ti_5O_{12}$ (LTO) Swagelok cells with 0.1 mm-thick and 1.0 mm-thick electrodes; the data shows that Swagelok cells with thicker electrodes have higher impedance.
Figure 6B:
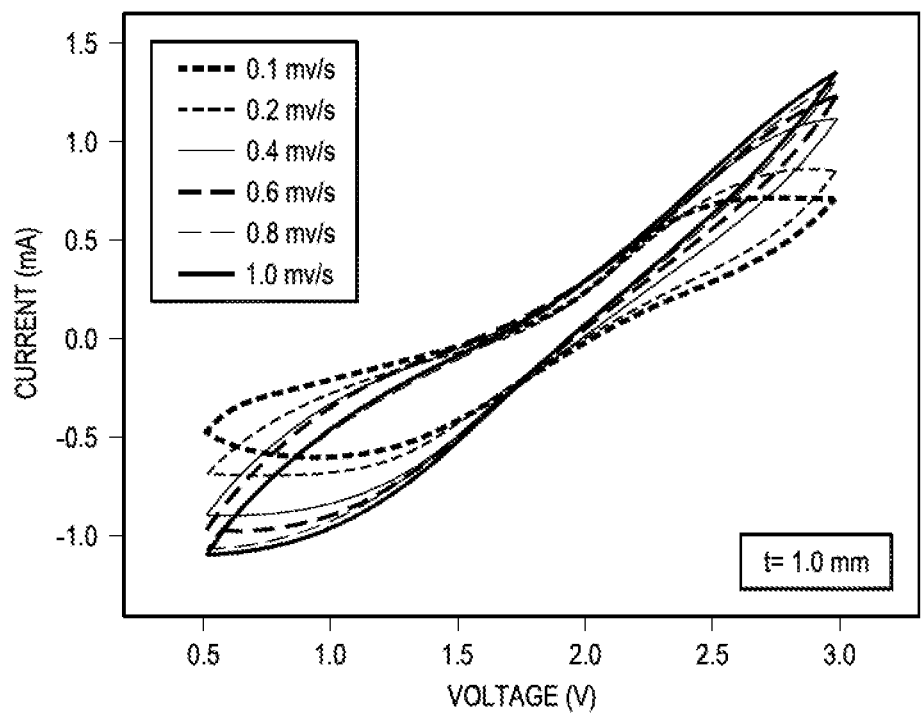
FIG. 6B shows cyclic voltammetry data for thick (1.0 mm) electrodes at varying scan rates (0.1 mV s$^{-1}$ to 1.0 mV s$^{-1}$).
Figure 6C:
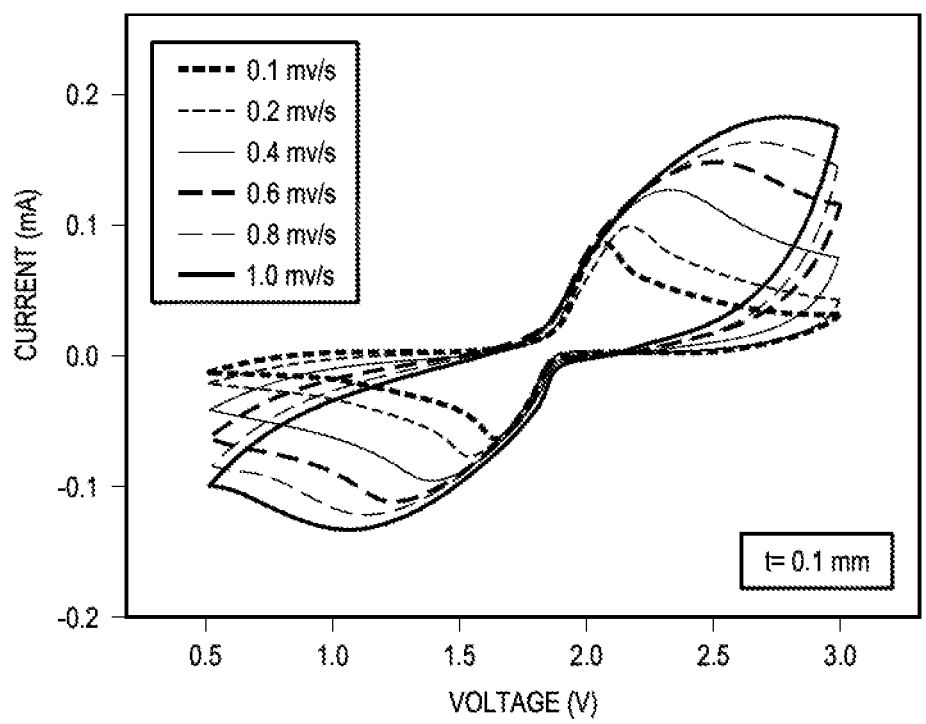
FIG. 6C shows cyclic voltammetry data for thin (0.1 mm) electrodes at varying scan rates (0.1 mV s$^{-1}$ to 1.0 mV s$^{-1}$); the data of FIGS. 6B and 6C reveal that thicker electrodes have higher current responses.
Figure 6D:
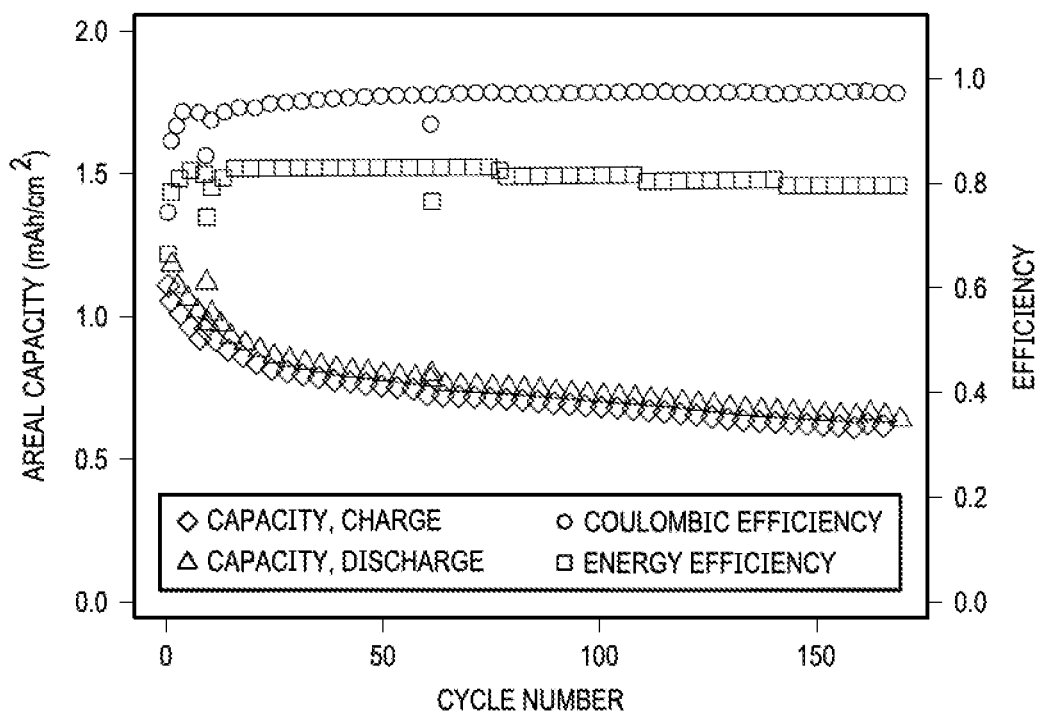
FIG. 6D shows cycle life for LFP/LTO Swagelok cells with thin (0.1 mm) electrodes at 0.2 mA cm$^{-2}$.
Figure 6E:
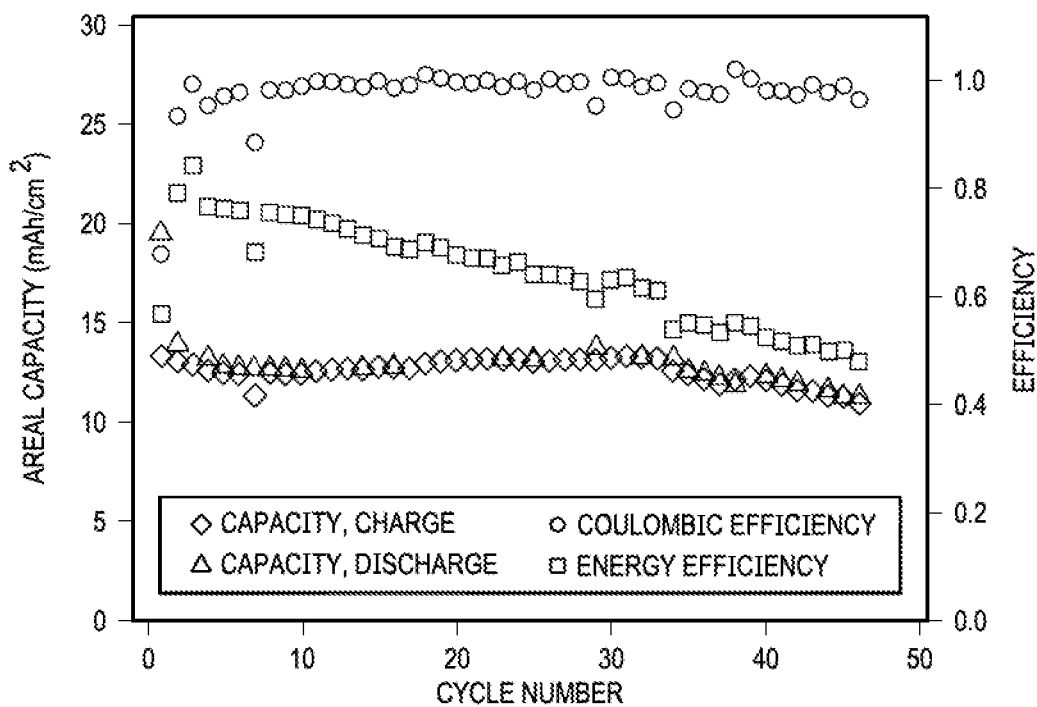
FIG. 6E shows cycle life for LFP/LTO Swagelok cells with thick (1.0 mm) electrodes at 0.2 mA cm$^{-2}$. The data of FIGS. 6D and 6E reveal that both test cells (FIGS. 6D and 6E) exhibit steadily high Coulombic efficiencies; however, the data of FIG. 6E shows a steadily declining energy efficiency for the thick electrode test cell.
Figure 6F:
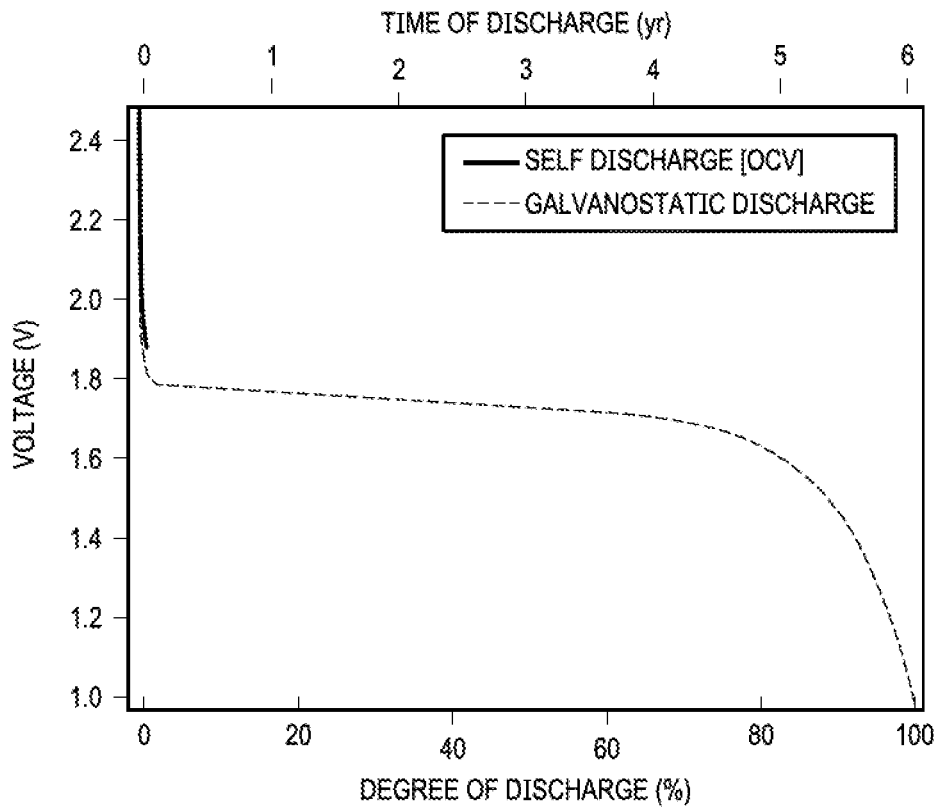
FIG. 6F shows self-discharge data measured over 20 days for a LFP/LTO Swagelok cell with 1.0 mm electrodes showing a shelf-life of roughly 6 years; the galvanostatic discharge curve is plotted alongside these data for a 1 mm thick LFP/LTO Swagelok cell discharged at 0.2 mA cm$^{-2}$.
Figure 7:
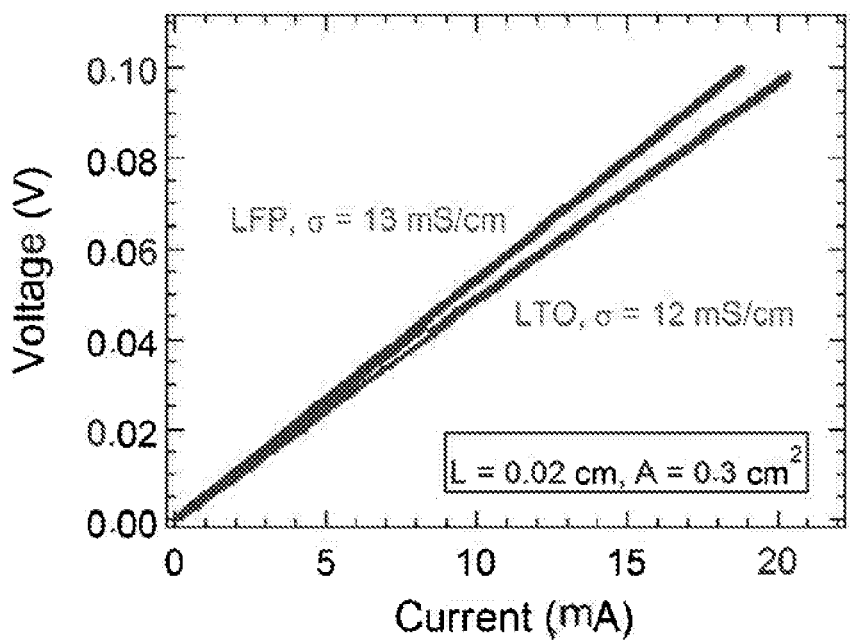
FIG. 7 is a plot of DC characterization data for LFP (cathode) and LTO (anode) semi-solid electrodes revealing a high electronic conductivity for each (13 mS cm$^{-1}$ and 12 mS cm$^{-1}$, respectively).

To investigate electrode thickness effects, AC impedance measurements were carried out on LFP/LTO Swagelok cells with thin (0.1 mm) and thick (1 mm) semi-solid electrodes. As expected, the bulk (x-intercept) and charge transfer (semi-circle size) resistances are higher for the thick electrodes, as can be seen in FIG. 6A. At low frequencies, the thick electrodes also exhibit a smaller slope, where diffusion is limited by mass-transfer. Based on DC ohmic measurements, the LFP and LTO semi-solid electrodes exhibit an electronic conductivity of 13 and 12 mS cm$^{-1}$, respectively, as indicated in FIG. 7, which is more than two-fold higher than the ionic conductivity of the electrolyte (5 mS cm$^{-1}$ for 1M LiTFSI/PC). High electronic conductivities are achieved at a low carbon particle volume fraction due to the efficient microstructural distribution (percolative network), as evidenced in FIGS. 4A-4D. Cyclic voltammetry measurements reveal that the thick electrodes exhibit a much higher (~10 times at low scan rate) peak current, albeit with broader redox peaks and peak-to-peak potential-differences, owing to slower kinetics, as shown in FIGS. 6B and 6C. Both thin and thick electrodes exhibit excellent Coulombic efficiencies and satisfactory areal capacities over several months of continuous cycling, as indicated in FIGS. 6D and 6E. While the thick electrodes delivered more than 10 times the areal capacity compared to their thin counterparts, their energy efficiency falls off considerably with increasing cycle number, due to increased voltage polarization. Hence, LIBs with thick semi-solid electrodes may be better suited for applications that require a high amount of energy and fewer charge/discharge cycles. Self-discharge characteristics are also important, especially for utilizing the thick electrodes in low power, intermittent applications. The open circuit voltage for a full LFP/LTO cell with 1 mm semi-solid electrodes is recorded and compared against an identical cell's discharge curve at 0.2 mA cm$^{-2}$ in FIG. 6F. After 20 days, a 0.9% drop in capacity due to self-discharge is observed, which suggests a shelf life of roughly 6 years (100% capacity loss).

Figure 8A:
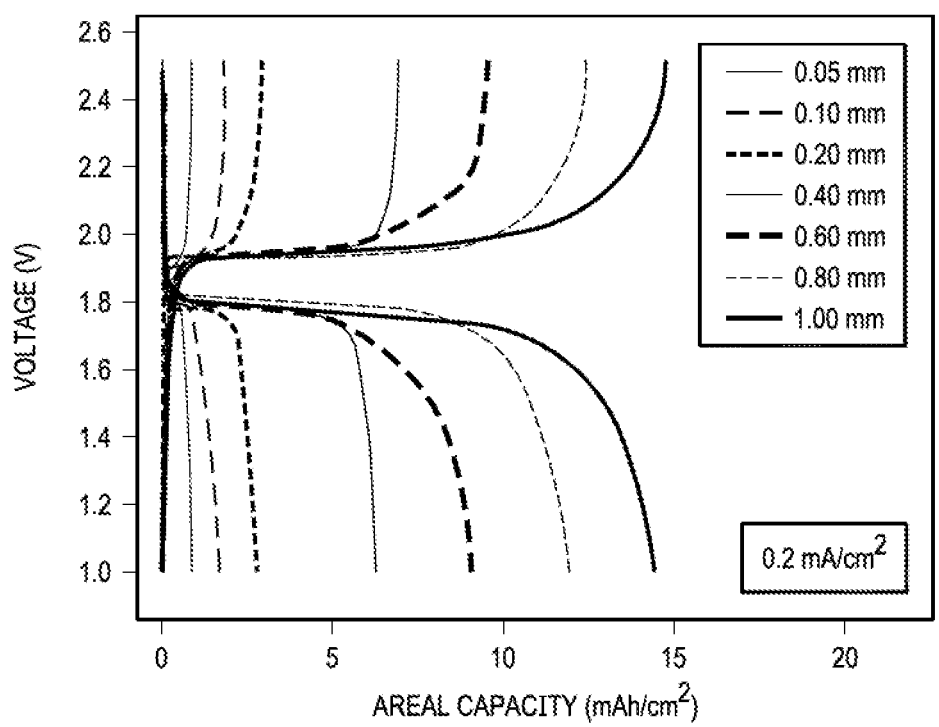
FIG. 8A shows areal capacity data for LFP/LTO Swagelok cells at varying electrode thicknesses (0.05 mm to 1.0 mm), revealing that thicker electrodes deliver higher areal capacities at 0.2 mA cm$^{-2}$.
Figure 8B:
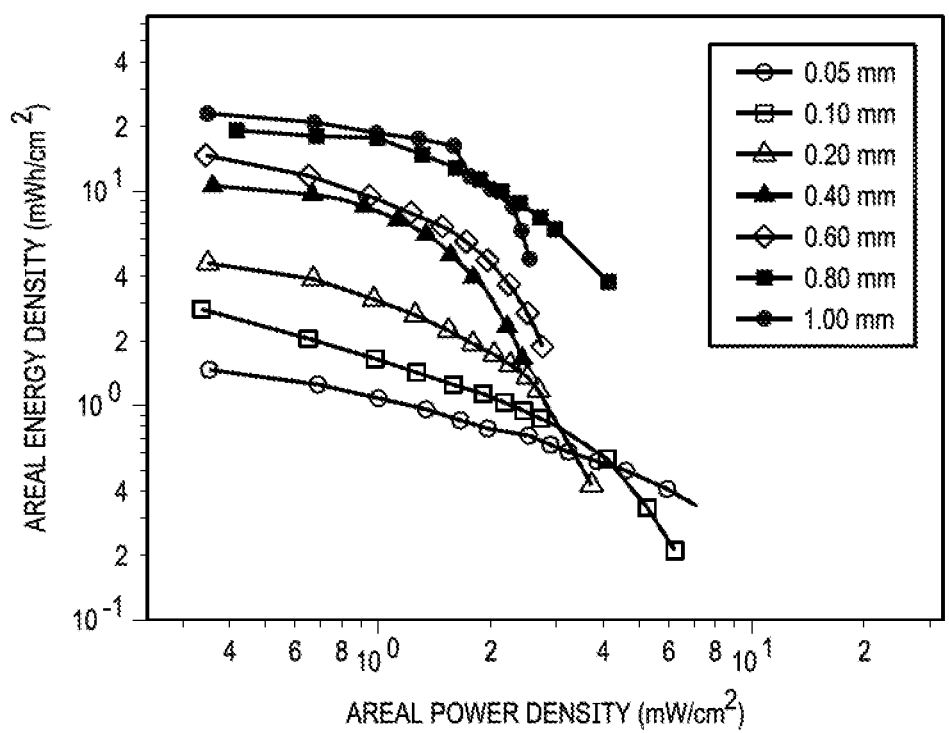
FIG. 8B is a Ragone plot showing energy density as a function of power density for LFP/LTO Swagelok cells at varying electrode thicknesses (0.05 mm to 1.0 mm), showing that thicker electrodes have higher areal energy densities.

Rigorous galvanostatic cycling tests with Swagelok cells are carried out using standardized stainless steel current collectors with thin separator films (25 µm) (Celgard, LLC) to assess the impact of electrode thickness from 50 µm (0.05 mm; representing commercial LIBs) to 1 mm on cycling performance at current densities varying from 0.2 to 2.0 mA cm$^{-2}$. FIG. 8A shows the expected trend of increasing areal capacity with increasing electrode thickness at 0.2 mA cm$^{-2}$, with the 1 mm cells (LFP loading of 108 mg cm$^{-2}$) delivering ~14.5 mAh cm$^{-2}$. The Ragone plot shown in FIG. 8B summarizes the cycling data over various electrode thicknesses and current densities, and clearly indicates that full LFP/LTO cells with thicker semi-solid electrodes exhibit superior areal energy density, while largely retaining the areal power density of thinner semi-solid electrodes.

Figure 9A:
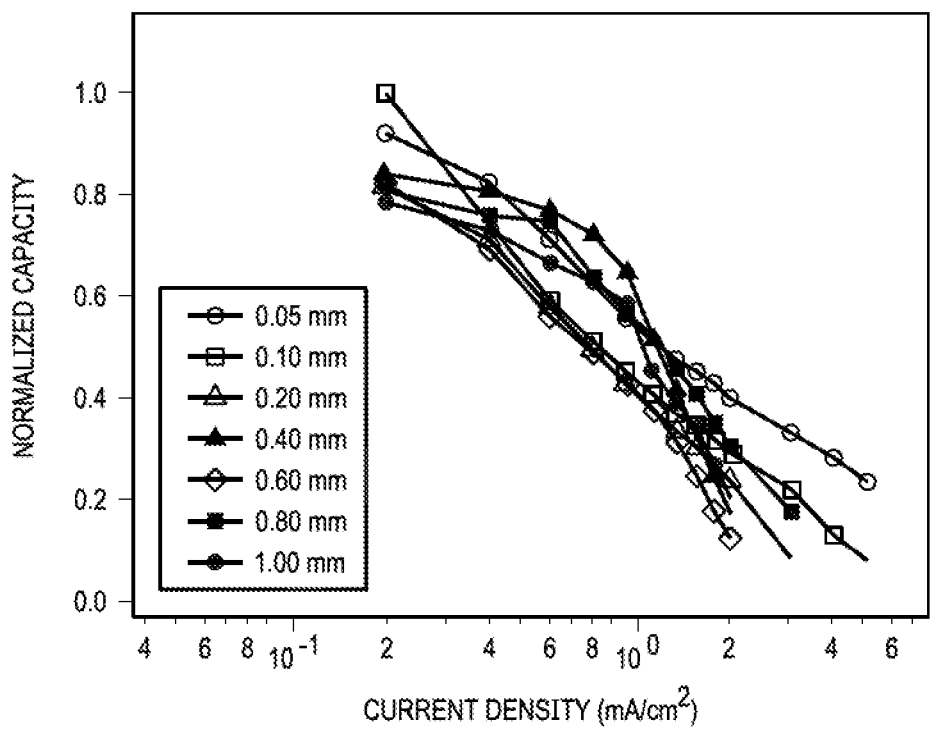
FIG. 9A shows normalized capacity versus current density for LFP/LTO Swagelok cells at varying electrode thicknesses (0.05 mm to 1.0 mm) showing a similar rate of decay, independent of electrode thickness.
Figure 9B:
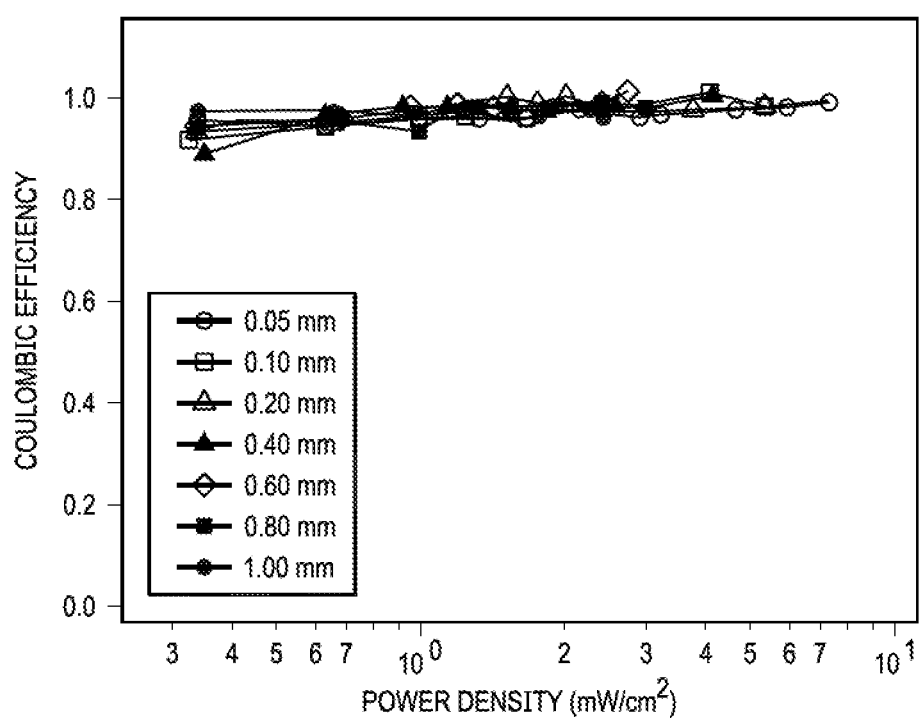
FIG. 9B shows that Coulombic efficiency for the LFP/LTO Swagelok cells is consistently high for all electrode thicknesses.
Figure 9C:
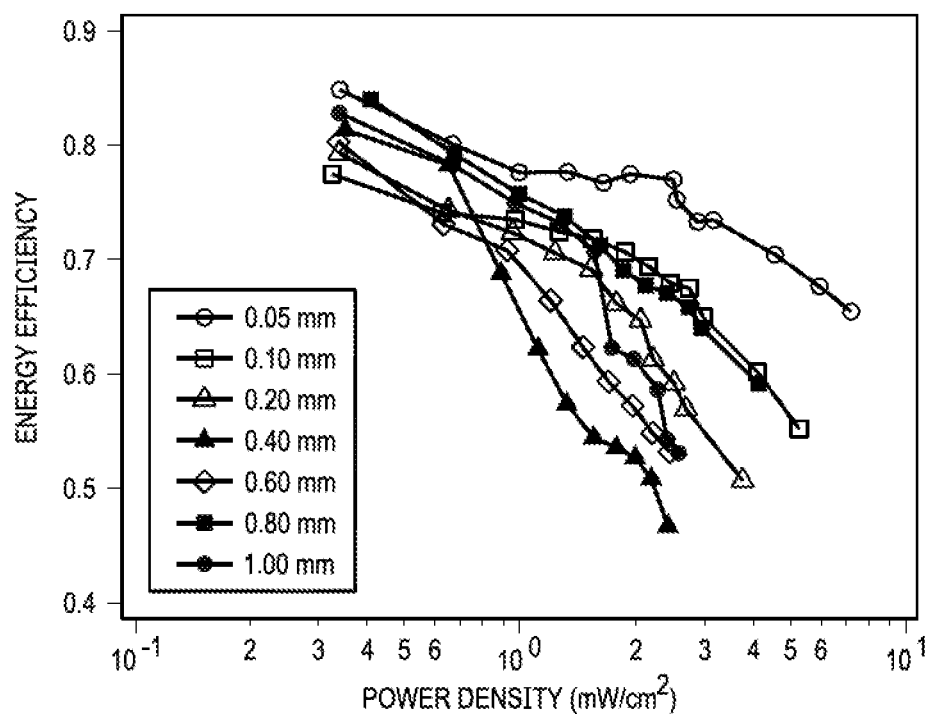
FIG. 9C shows that the energy efficiency of the LFP/LTO Swagelok cells decays more significantly for the battery with thicker electrodes.

The high-rate performance of thick electrodes is notoriously poor due to longer ion diffusion distances and accelerated local depletion of Li ions at electrolyte-electroactive particle interfaces. However, in this work, normalized capacity ($Q_{discharge}$-$Q_{theoretical}$) as a function of current density exhibits nearly the same trend independent of electrode thickness, as evidenced in FIG. 9A. This result may be due to both the efficient distribution of electroactive and conductive particles within the semi-solid electrodes as well as their high electrolyte content. From the cycling data, electrodes of varying thickness exhibit a Coulombic efficiency of near unity, as shown in FIG. 9B. The observed energy loss revealed in FIG. 9C is due primarily to the increased overpotential from chemical polarization and heat generation, which is expected for thick electrodes due to their inherently slower diffusion kinetics and increased bulk resistance.

Electrochemical Performance of 3D Printed LIBs

Fully 3D printed and packaged LIB with thick semi-solid electrodes (1 mm) are produced in a customized design and their electrochemical performance is investigated.

Figure 10A:
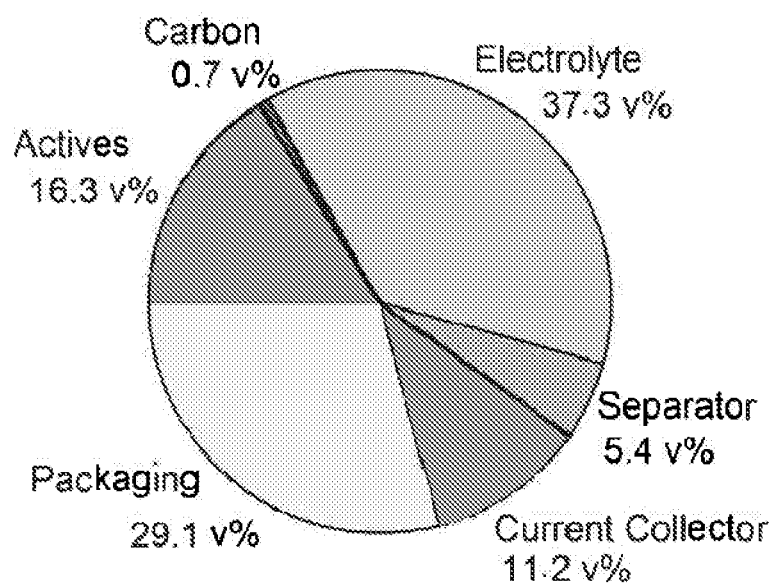
FIG. 10A is a pie chart showing the volumetric distribution of components of the exemplary 3D printed lithium ion battery shown schematically in FIG. 2, assuming dimensions of 1 cm×1 cm×2.5 mm with a 6 mm×6 mm center hole.
Figure 10B:
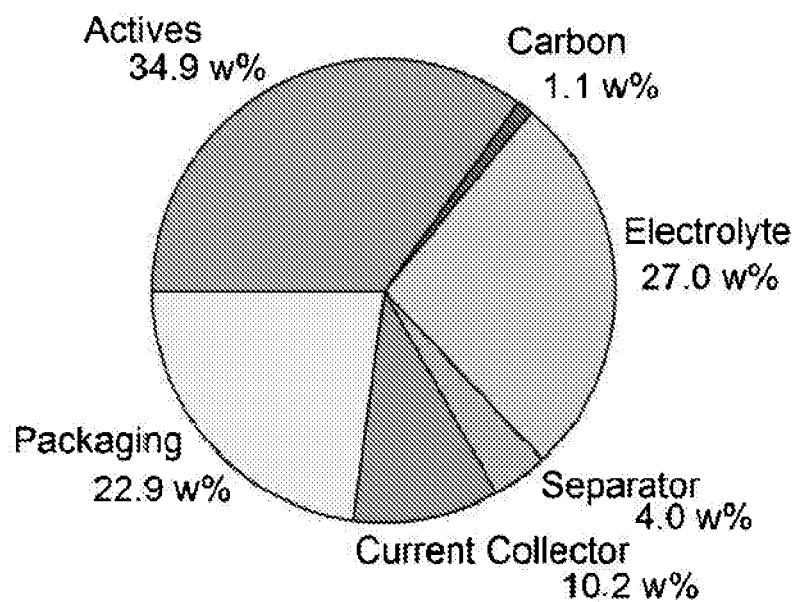
FIG. 10B is a pie chart showing the gravimetric distribution of components of the exemplary 3D printed lithium ion battery shown schematically in FIG. 2, assuming dimensions of 1 cm×1 cm×2.5 mm with a 6 mm×6 mm center hole.
Figure 11A:
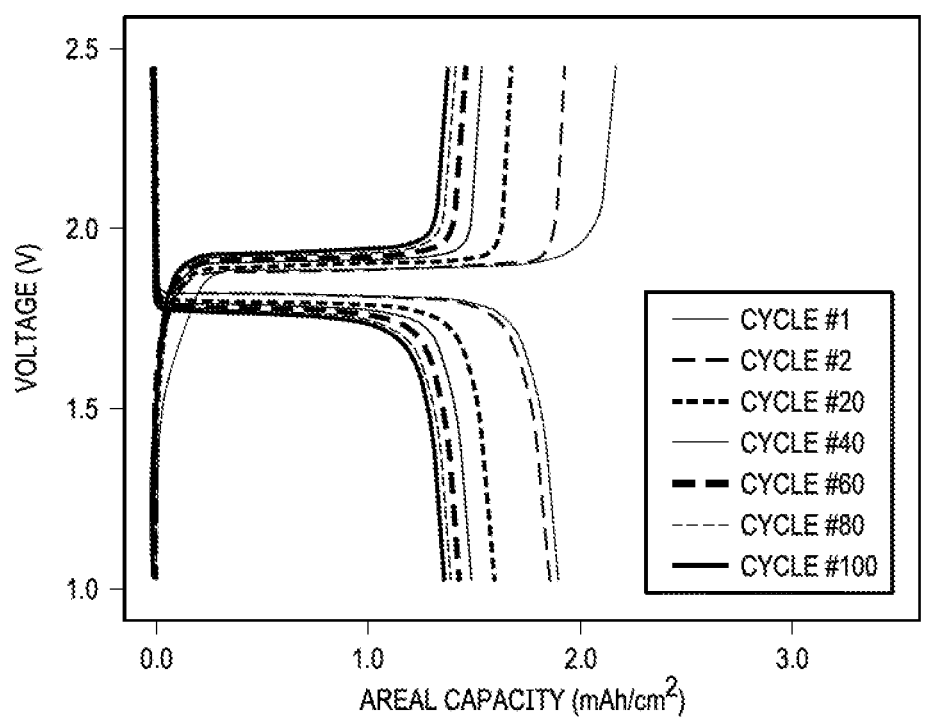
FIG. 11A shows areal capacity vs. cycle number for a LFP/LTO Swagelok cell with glassy carbon current collectors and 0.1 mm electrodes cycled at 0.2 mA cm$^{-2}$.
Figure 11B:
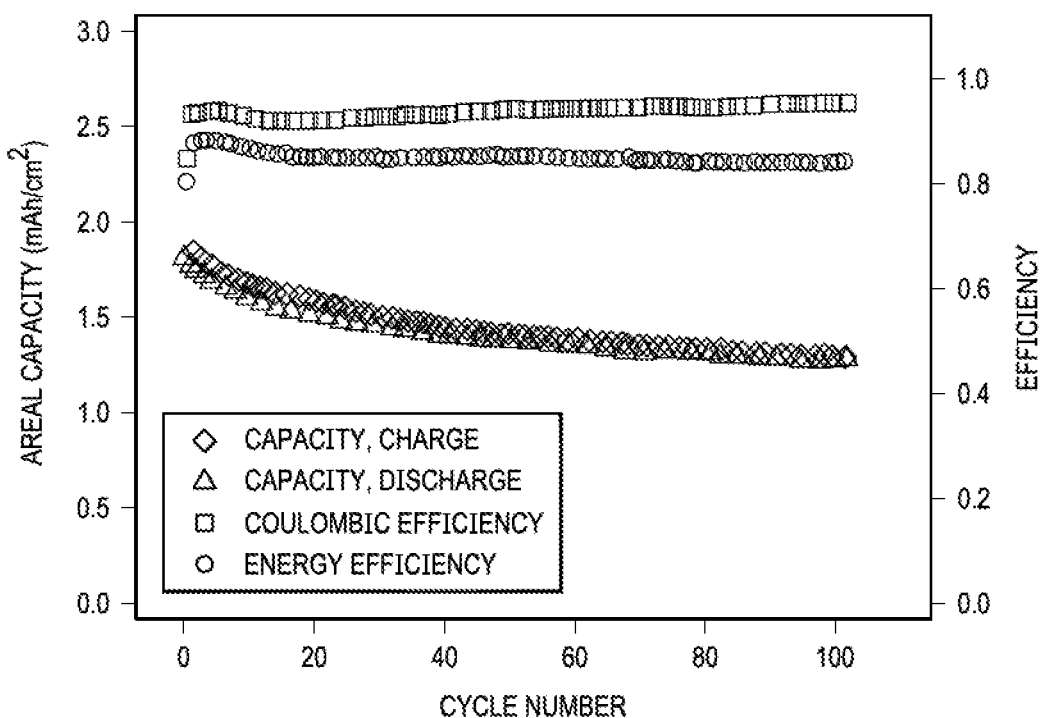
FIG. 11B shows cycling curves for selected cycles of cycle life characterization of a LFP/LTO Swagelok cell with glassy carbon current collectors and 0.1 mm electrodes cycled at 0.2 mA cm$^{-2}$.
Figure 11C:
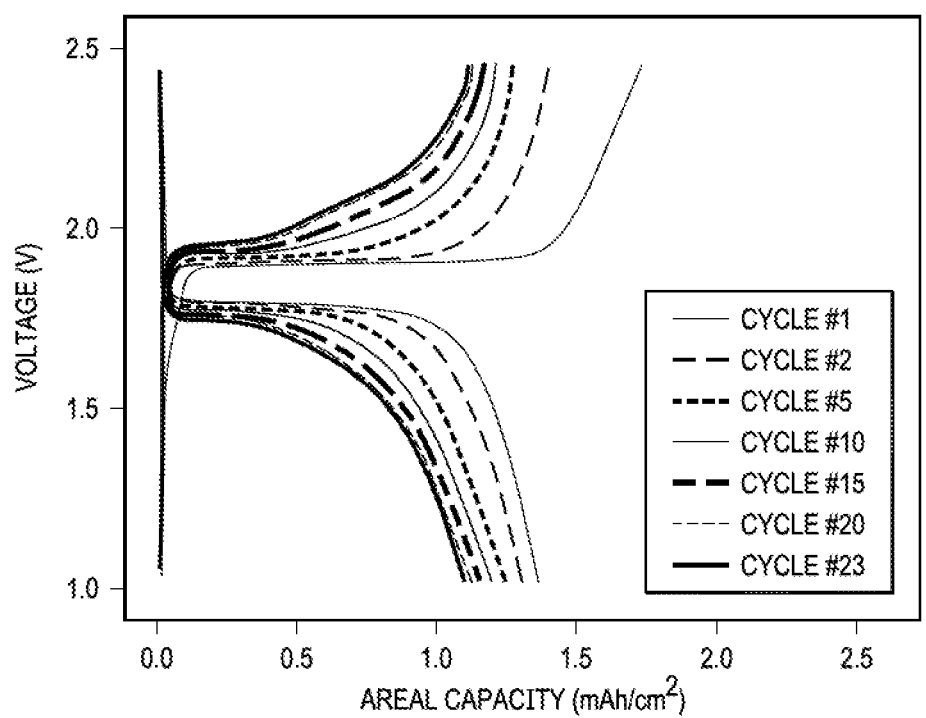
FIG. 11C shows areal capacity vs. cycle number for a LFP/LTO Swagelok cell with a UV-cured composite separator and 0.1 mm electrodes cycled at 0.2 mA cm$^{-2}$.
Figure 11D:
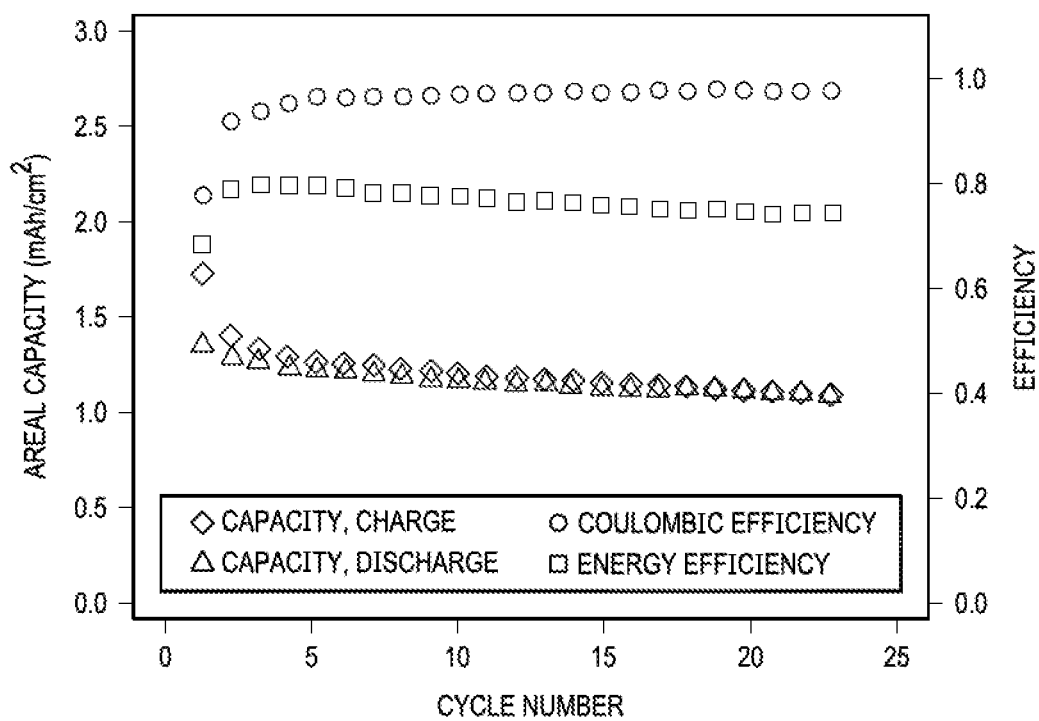
FIG. 11D shows cycling curves of selected cycles of cycle life characterization of a LFP/LTO Swagelok cell with a UV-cured composite separator and 0.1 mm electrodes cycled at 0.2 mA cm$^{-2}$.

Square donut cells are printed with an outer border (L=10 mm, W=10 mm, H=2.5 mm) that surrounds an inner, open region (L=6 mm, W=6 mm, H=2.5 mm), as illustrated in FIGS. 1A-1D and FIG. 2. The volumetric and gravimetric electrode content within these printed LIBs are 54 vol. % and 63 wt. %, respectively, as shown in the pie charts of FIGS. 10A and 10B. They are capped on the top and bottom with current collectors that are laser-cut into the desired geometry from a thin glassy carbon sheet. This report is believed to be the first time that glassy carbon is used as a current collector for LIBs despite its high electrical (3.5× 10$^{-3}$ Ωcm) and thermal (17.5 W m$^{-1}$ k$^{-1}$) conductivity, light weight and low gas permeability. In addition, these laser-cut glassy carbon current collectors remain flat ensuring uniform contact with the printed electrode inks. Prior to characterizing the performance of fully printed and packaged LIBs, continuous cycling data for a LFP/LTO Swagelok cell with 0.1 mm electrodes is collected using glassy carbon as the current collectors, as shown in FIGS. 11A and 11B. This full LFP/LTO cell exhibited excellent cycle life with high Coulombic efficiency. Next, a 100 µm thin film of the composite separator is cast and UV cured and used to replace the commercial Celgard separator used previously. Referring to FIGS. 11C and 11D, the cycling performance of a LFP/LTO Swagelok cell with 100 µm electrodes indicates that satisfactory capacity, Coulombic and energy efficiencies are achieved with minimal capacity fade over 20 cycles. The lowered energy efficiency is likely due to the increased separator thickness.

Figure 12A:
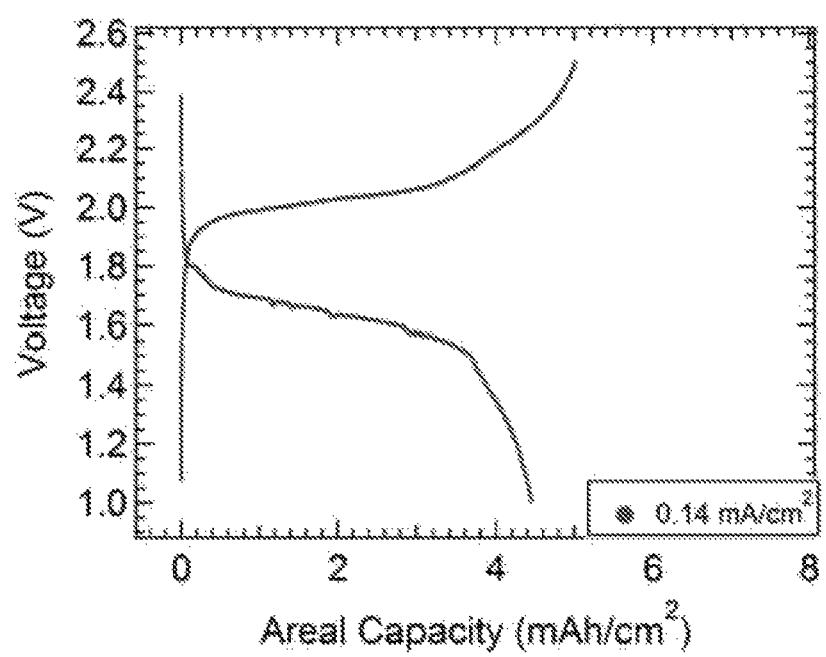
FIG. 12A shows cycling curves of the $2^{nd}$ cycle at 0.14 mA cm$^{-2}$ of a 3D printed LIB with biphasic LFP and LTO electrodes, UV-cured composite separator, UV-cured composite packaging, and glassy carbon current collectors.
Figure 12B:
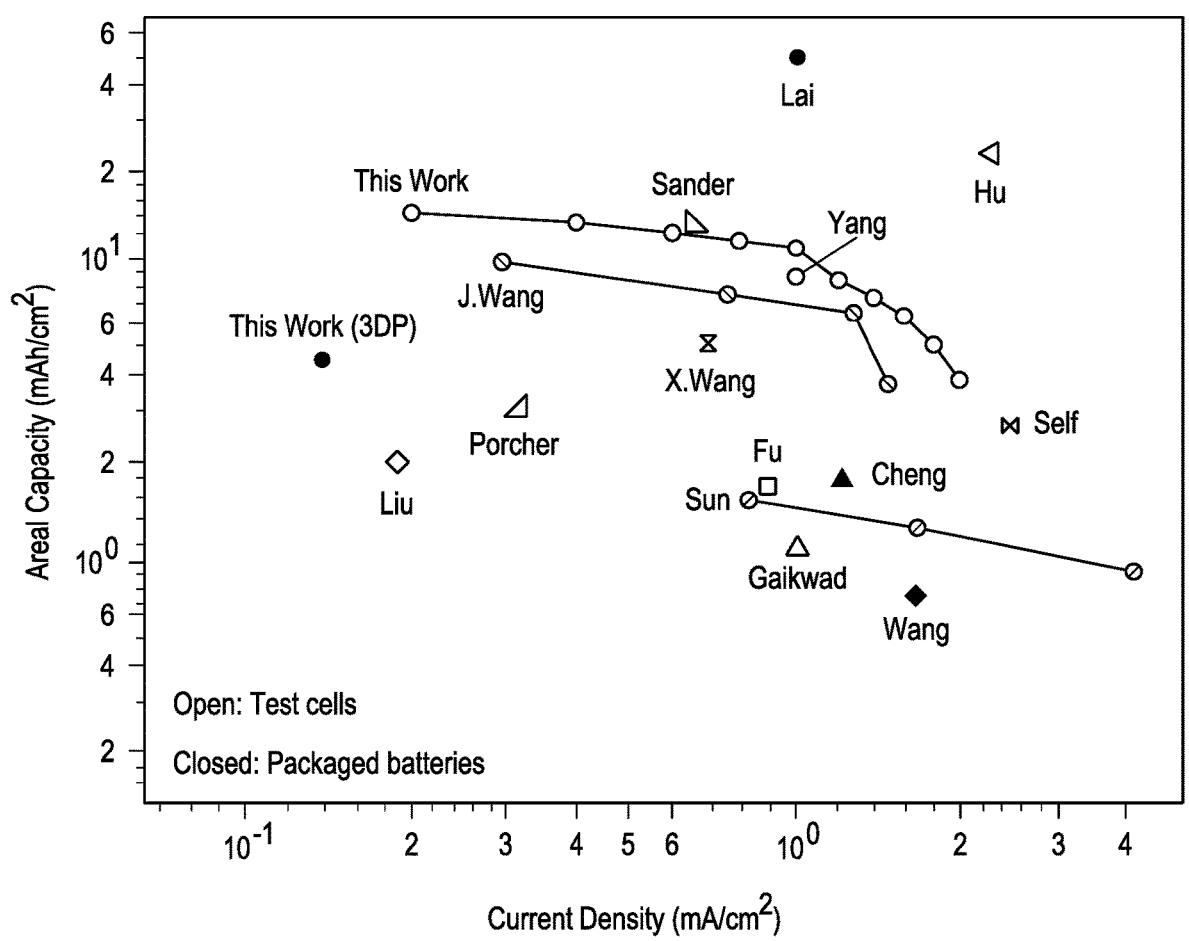
FIG. 12B shows a Ragone plot comparing areal capacity versus current density for a LFP/LTO Swagelok cell with 1 mm electrodes and a fully packaged, 3D printed LIB to reported literature values. Open symbol denotes reports demonstrated test cells with per-electrode areal capacity values; closed symbol denotes reports demonstrated fully packaged batteries with per battery areal capacity values.

As a final step, the electrochemical performance of fully 3D printed and packaged LIBs composed of thick LFP/LTO semi-solid electrodes, customized separator and packaging materials, and glassy carbon current collectors is evaluated. Referring to FIG. 12A, these LIBs deliver an areal capacity of 4.45 mAh cm$^{-2}$ ($2^{nd}$ cycle) at a current density of 0.14 mA cm$^{-2}$, with the entire area occupied of the battery properly considered. The Ragone plot shows that the 3D printed LIBs and 1 mm biphasic LFP/LTO Swagelok cell data compare favorably to values reported for other cell configurations (e.g., coin, Swagelok, and beaker cells) (FIG. 12B). Moreover, the fully printed and packaged LIB delivers impressive areal capacity, albeit lower than the unpackaged cell, still exceeding the values of several other (unpackaged) batteries. As one example, these LIBs exhibit a four-fold increase in performance over our unpackaged interdigitated electrode Li-ion battery reported previously. Given the lower normalized capacity (43.35%), Coulombic efficiency (89%) and energy efficiency (67.7%) of these fully 3D printed and packaged LIBs, further optimization may be required to realize their full potential.

Experimental Details

Ink synthesis: The materials used to synthesize the four ink formulations discussed above include carbon-coated LiFePO$_4$ (LFP) (M121, Advanced Lithium Electrochemistry Co., Ltd., Taoyuan, Taiwan) and carbon-coated Li$_4$Ti$_5$O$_{12}$ (LTO) (LTO-1, BTR NanoTech Co., Shenzhen, China) electroactive particles, and Ketjenblack (KB) (EC-600JD, Azko Nobel Polymer Chemicals LLC, Chicago, USA) conductive particles. Propylene carbonate (PC) (anhydrous, 99.7%), polyvinylpyrrolidone (PVP) (Mw=40 kg mol$^{-1}$), Triton X-100 (TX-100) (laboratory grade), ETPTA (Mw=428, trivalent acrylate monomer), HMPP (2-hydroxy-2-methyl-1-phenyl-1-propanon, photo-initiator) were acquired from Sigma-Aldrich. The lithium bis(trifluoromethane) sulfonamide (LiTFSI) was provided by BASF. The fumed SiO$_2$ used in the packaging ink was supplied by Cabot (CAB-O-SIL TS-720). The Al$_2$O$_3$ used in the separator ink was from Sumitomo Chemical (AKP-30). The UV-curing epoxy was obtained from Electronics Materials Inc. (Optocast 3553-40k).

Biphasic electrode suspensions are prepared in an argon-filled glovebox with moisture and oxygen content maintained under 0.5 ppm. All dry materials are heated at 120° C. overnight under vacuum to remove moisture. First, 250 mL HDPE bottles are filled with 5 mm (250 g) and 0.5 mm (150 g) yttrium stabilized zirconia (YSZ) milling beads. Next, PC (50 g), PVP (0.1 g), and LFP or LTO powder (10 g) are added. The bottles are sealed and the suspensions are ball-milled (US Stoneware) under ambient conditions for 24 h. The suspensions are then filtered through 20 μm stainless steel sieves in the argon-filled glovebox. The filtered suspensions are sealed in the glovebox and centrifuged (Beckman Avanti J-25 I) at 12,500 g for 30 min to collect the dispersed particles. After removing the supernatant, the dense sediment (typically 65 wt. % solids content) is collected and homogenized using a planetary mixer (Thinky AR-100). Additional PC is next added and mixed. LiTFSI is then added to achieve 1 M electrolyte concentration. Finally, KB powder is added and homogenized. The final ink compositions are 30 vol. % LFP with 1.25 vol. % KB for the cathode and 30 vol. % LTO with 1.35 vol. % KB for the anode in 1M LiTFSI/PC with 1 wt. % PVP % (with respect to LFP or LTO) to transition LFP and LTO into repulsive particles.

The separator ink formulation is prepared by ball milling, filtering, and centrifuging a Al$_2$O$_3$ suspension the same way as with the first and second electrode ink formulations, but the starting materials are PC (50 g), TX-100 (1 g), and Al$_2$O$_3$ powder (20 g) instead. Once the dense sediment (typically 78 wt. % solids) is collected in a UV-protected scintillation vial and homogenized, appropriate amount of 2% HMMP solution (ETPTA:HMMP=100:1) and 1 M LiTFSI/PC are then added and Thinky-mixed. Finally, the ETPTA is added, in which the vial is sealed and vortex-mixed for 30 min at 1500 rpm followed by 1 min Thinky-mix to avoid partial curing from overheating. The packaging ink formulation is prepared by mixing 4 vol. % of fumed SiO$_2$ into UV-curing epoxy through multiple cycles of Thinky-homogenization in a UV-protected scintillation vial.

Rheology & Microscopy Characterization: Rheology is performed at 22° C. on a TA Instrument AR-2000EX rheometer using smooth surface finish stainless steel parallel plates or cone & plate geometries with the appropriate diameter (20, 40, or 60 mm) at the appropriate gap heights (0.5 to 1.5 mm) gap height. Small diameter parallel plates are used for high viscosity samples with larger gap heights to prevent the wall-slip effects. Solvent trap is added not only to prevent evaporation, but to block UV-light when testing separator and packaging inks. Oscillatory measurements (G', G") were done at fixed frequency (10 rad s$^{-1}$). All samples are pre-sheared at 1 s$^{-1}$ for 60 s prior to measurement and left to equilibrate until the normal force relaxes (~60 s).

Micrographs of KB suspensions are taken with an inverted optical microscope (OLYMPUS IX71). The repulsive SiO$_2$ particles are dispersed with PVP and imaged using index-matched water-glycerol solution. Suspensions are sandwiched between two cover slides for imaging.

Electrochemical and Conductivity Characterization: All electrochemical experiments are performed using the Bio-logic VMP-3 potentiostat. A standard galvanostatic cycling setup includes a two-electrode Swagelok cell with a porous polymer separator film (Celgard, LLC) soaked in electrolyte (1M LiTFSI/PC), stainless steel current collectors, and PTFE spacers to define the electrode thickness (area=0.5 cm$^2$). Glassy carbon and composite separator characterization are performed with circular cutout of them placed appropriately to replace the separator or stainless steel current collectors.

Electronic conductivities of the biphasic electrode inks are measured by the DC method, where the voltage is swept from 0 to 100 mV (Biologic VMP-3). The test cell used is a modified Swagelok cell with a cylindrical volume for the material of interest, sandwiched by two stainless steel electrodes. An AC impedance study is performed with fully assembled Swagelok cells at amplitude of 10 mV and frequency range of 0.1 Hz to 0.3 MHz for the 1.0 mm electrodes, and 1 Hz to 0.2 MHz for the 0.1 mm electrodes. A CV study is also performed with fully assembled Swagelok cells from 0.5 to 3.0 V at various scan rates. A self-discharge test is done by first fully charging the battery to 2.5 V at 0.2 mA cm$^{-2}$, then holding it at 2.5 V for 24 h, then start to record the open circuit voltage (OCV) over 20 days.

3D Printing of Lithium Ion Batteries: LIBs are fabricated using a custom-made 3D printer that was assembled and operated inside of an Ar-filled glovebox consisting of a 3-axis micropositioning stage (Sherline 5400) motorized by stepper motors (CNC4PC, CS4EA4-1Rev1), controlled by computer-aided milling software (Mach3). The cathode, anode, separator, and packaging ink formulations are housed in separate 3 ml syringes (UV-protected ones for separator and packaging) and attached by luer-lok to the appropriately sized (as small as 100 μm) metal tips (EFD Inc.). An Ar-powered fluid dispenser (HP3cc, EFD Inc.) is used to pressurize the barrel up to 700 psi to control the flow rate. The pressure is analog-controlled and its Mach3-macro is custom-written to enable coded pressure change, alongside coded movement through g-code.

First, the packaging ink formulation is printed onto the laser-cut (Photonics Industries, DC150H-355) glassy carbon substrate (Goodfellow, Vitreous 1000C, thickness=0.18 mm) to a height of 2.5 mm tall followed by 60 min of UV-curing (UVL-21, 365 nm, 4 W, by UVP). The anode ink formulation is next printed onto the glassy carbon substrate within the packaging walls to a height (thickness) of 1 mm, forming the anode. The separator ink formulation is then printed onto the anode to form a thin separator precursor, followed by 30 min of UV-curing to form the separator. The cathode ink formulation is next printed onto the separator to a height (thickness) of 1.0 mm, forming the cathode. The glassy carbon lid is then carefully placed on top of the cathode. Lastly, the packaging ink formulation is printed on top of a lid to seal/bond it to the UV-cured packaging walls. A final UV-curing step (30 min) is carried out to finish the battery fabrication. The UV curing steps may be shortened significantly if a higher wattage UV lamp is used. The substrate, anode, separator, cathode, lid, seal, and packaging of this example are 0.18 mm, 1 mm, 0.1 mm, 1 mm, 0.18 mm, 0.1 mm, and 2.4 mm thick, respectively.

Electrochemical Characterization of 3D Printed LIBs: The 3D printed LIBs are tested by attaching copper leads to the glassy carbon current collectors with a conductive silver paste to avoid excessive clamping force with the usual alligator clamps. The cycling tests were performed at a current density of 0.14 mA cm$^{-2}$, with the entire area occupied by the battery properly considered.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of 3D printing a lithium-ion battery, the method comprising:
   extruding a packaging ink formulation and depositing one or more continuous filaments comprising the packaging ink formulation in a predetermined pattern on a substrate to form a first package portion;
   extruding a first electrode ink formulation through a first deposition nozzle moving relative to the substrate, and depositing one or more continuous filaments comprising the first electrode ink formulation in a predetermined pattern to print a first electrode on a first current collector disposed on the first package portion;
   extruding a separator ink formulation through a second deposition nozzle moving relative to the substrate, and depositing one or more continuous filaments comprising the separator ink formulation in a predetermined pattern to print a separator on the first electrode;
   extruding a second electrode ink formulation through a third deposition nozzle moving relative to the substrate, and depositing one or more continuous filaments comprising the second electrode ink formulation in a predetermined pattern to print a second electrode on the separator; and
   extruding the packaging ink formulation through a fourth deposition nozzle moving relative to the substrate, and depositing one or more continuous filaments comprising the packaging ink formulation in a predetermined pattern to form a second package portion in contact with the first package portion, the second package portion overlying a second current collector disposed on the second electrode, thereby forming a lithium-ion battery by 3D printing.

2. The method of claim 1, wherein the separator ink formulation includes a curable resin, inorganic filler particles, and an electrolyte, and
   further comprising curing the separator ink formulation.

3. The method of claim 1, wherein the packaging ink formulation includes a curable resin and inorganic filler particles, and
   further comprising curing the packaging ink formulation.

4. The method of claim 1, further comprising printing each of the first and second current collectors by extruding a conductive ink formulation through another deposition nozzle moving relative to a deposition surface, and depositing one or more continuous filaments comprising the conductive ink formulation in a predetermined pattern on the deposition surface,
   wherein the deposition surface for the first current collector comprises the substrate and the deposition surface for the second current collector comprises the second electrode.

5. The method of claim 1, further comprising fabricating the first and second current collectors from a conductive sheet comprising a conductive material, and
   wherein the conductive material comprises glassy carbon.

6. The method of claim 1, wherein the first electrode ink formulation comprises first electroactive particles, conductive particles, and an electrolyte.

7. The method of claim 6, wherein the first electroactive particles include a lithium-ion compound.

8. The method of claim 7, wherein the lithium-ion compound is selected from the group consisting of $Li_4Ti_5O_{12}$ (LTO), $LiNi_{0.5}Mn_{1.5}O_4$ (LNMO), $LiCoO_2$, $LiFePO_4$ (LFP), $LiTi_2(PO_4)_3$, and $LiV_3O_8$.

9. The method of claim 6, wherein the electrolyte comprises a lithium salt.

10. The method of claim 1, wherein the second electrode ink formulation comprises second electroactive particles, conductive particles, and an electrolyte.

11. The method of claim 10, wherein the second electroactive particles include a lithium-ion compound.

12. The method of claim 11, wherein the lithium-ion compound is selected from the group consisting of $Li_4Ti_5O_{12}$ (LTO), $LiNi_{0.5}Mn_{1.5}O_4$ (LNMO), $LiCoO_2$, $LiFePO_4$ (LFP), $LiTi_2(PO_4)_3$, and $LiV_3O_8$.

13. The method of claim 10, wherein the electrolyte comprises a lithium salt.

14. The method of claim 1, wherein each of the first and second electrodes has a thickness of at least about 300 microns.

15. The method of claim 1, wherein each of the first and second electrodes exhibits an electronic conductivity of at least about 10 mS cm$^{-1}$.

16. The method of claim 1, wherein the first and second electrodes have a volumetric content of at least about 50 vol. % of the battery.

17. The method of claim 1, wherein the first electrode ink formulation includes first electroactive particles comprising $LiFePO_4$ (LFP), and
 wherein the second electrode ink formulation includes second electroactive particles comprising $Li_4Ti_5O_{12}$ (LTO).

18. The method of claim 17, wherein the first and second electrode ink formulations include an electrolyte comprising lithium bis(trifluoromethane) sulfonimide (LiTFSI).

\* \* \* \* \*